United States Patent
Himei

(10) Patent No.: US 11,347,131 B2
(45) Date of Patent: May 31, 2022

(54) PROCESSING DEVICE, LENS ADAPTER, CAMERA BODY, AND ANTI-VIBRATION CONTROL METHOD

(71) Applicant: SONY CORPORATION, Tokyo (JP)

(72) Inventor: Norio Himei, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 400 days.

(21) Appl. No.: 16/318,727

(22) PCT Filed: Jul. 19, 2017

(86) PCT No.: PCT/JP2017/026067
§ 371 (c)(1),
(2) Date: Jan. 18, 2019

(87) PCT Pub. No.: WO2018/025639
PCT Pub. Date: Feb. 8, 2018

(65) Prior Publication Data
US 2019/0285967 A1 Sep. 19, 2019

(30) Foreign Application Priority Data
Aug. 1, 2016 (JP) .............................. JP2016-151269

(51) Int. Cl.
*G03B 17/14* (2021.01)
*G03B 5/00* (2021.01)
(Continued)

(52) U.S. Cl.
CPC .............. *G03B 5/00* (2013.01); *G02B 27/646* (2013.01); *G03B 17/14* (2013.01); *G03B 17/56* (2013.01);
(Continued)

(58) Field of Classification Search
CPC ...... G02B 27/646; G02B 27/64; G03B 17/14; G03B 17/56; G03B 5/00; G03B 2205/0007; H04N 5/232; H04N 5/23248
See application file for complete search history.

(56) References Cited

U.S. PATENT DOCUMENTS 5,257,058 A * 10/1993 Mabuchi ................ G03B 17/14
348/240.3
6,757,011 B1 * 6/2004 Takeda .................. G02B 27/646
348/208.7

(Continued)

FOREIGN PATENT DOCUMENTS

JP 05-276429 A 10/1993
JP 07-104338 A 4/1995
(Continued)

OTHER PUBLICATIONS

Examiner provided machine translation of Imada et al., JP H07104338 A (Year: 1995).*

(Continued)

*Primary Examiner* — Balram T Parbadia
(74) *Attorney, Agent, or Firm* — Chip Law Group

(57) ABSTRACT

Provided is a processing device including a determination unit that determines, in a case in which a lens unit is mounted on a camera body via a lens adapter having an anti-vibration function of suppressing blur in a captured image, whether the lens unit has the anti-vibration function. The determination unit further causes the lens adapter to perform a coordinative arithmetic operation for anti-vibration on the basis of determination that the lens unit has the anti-vibration function.

16 Claims, 29 Drawing Sheets

(51) Int. Cl.
*G02B 27/64* (2006.01)
*G03B 17/56* (2021.01)
*H04N 5/232* (2006.01)

(52) U.S. Cl.
CPC . *H04N 5/23248* (2013.01); *G03B 2205/0007* (2013.01)

(56) References Cited

U.S. PATENT DOCUMENTS

| | | | | |
|---|---|---|---|---|
| 6,963,388 | B1* | 11/2005 | Ohta | H04N 5/232123 348/349 |
| 2002/0026696 | A1* | 3/2002 | Takeda | H04N 5/23258 27/21.1 |
| 2002/0141061 | A1* | 10/2002 | Takeda | G02B 27/646 359/554 |
| 2006/0013575 | A1* | 1/2006 | Senba | G03B 17/14 396/55 |
| 2010/0091175 | A1* | 4/2010 | Shintani | G03B 13/36 348/345 |
| 2011/0103789 | A1* | 5/2011 | Honjo | H04N 5/23209 396/530 |
| 2015/0234198 | A1* | 8/2015 | Hayakawa | G03B 5/06 348/375 |
| 2015/0264266 | A1* | 9/2015 | Katsuyama | H04N 5/23209 348/208.2 |
| 2015/0281581 | A1 | 10/2015 | Sakurai et al. | |
| 2015/0281582 | A1 | 10/2015 | Sakurai et al. | |

FOREIGN PATENT DOCUMENTS

| | | |
|---|---|---|
| JP | 07-168230 A | 7/1995 |
| JP | 07-191357 A | 7/1995 |
| JP | 10-213833 A | 8/1998 |
| JP | 2000-075339 A | 3/2000 |
| JP | 2007-025298 A | 2/2007 |
| JP | 2007-148045 A | 6/2007 |
| JP | 2009-075221 A | 4/2009 |
| JP | 2011-107520 A | 6/2011 |
| JP | 2015-194711 A | 11/2015 |
| JP | 2015-194712 A | 11/2015 |
| WO | 2009/008164 A1 | 1/2009 |

OTHER PUBLICATIONS

Extended European Search Report of EP Application No. 17836745.4, dated Jul. 1, 2019, 09 pages.

International Search Report and Written Opinion of PCT Application No. PCT/JP2017/026067, dated Oct. 17, 2017, 09 pages of ISRWO.

Office Action for JP Patent Application No. 2018-531823, dated Jul. 6, 2021, 02 pages of English Translation and 03 pages of Office Action.

* cited by examiner

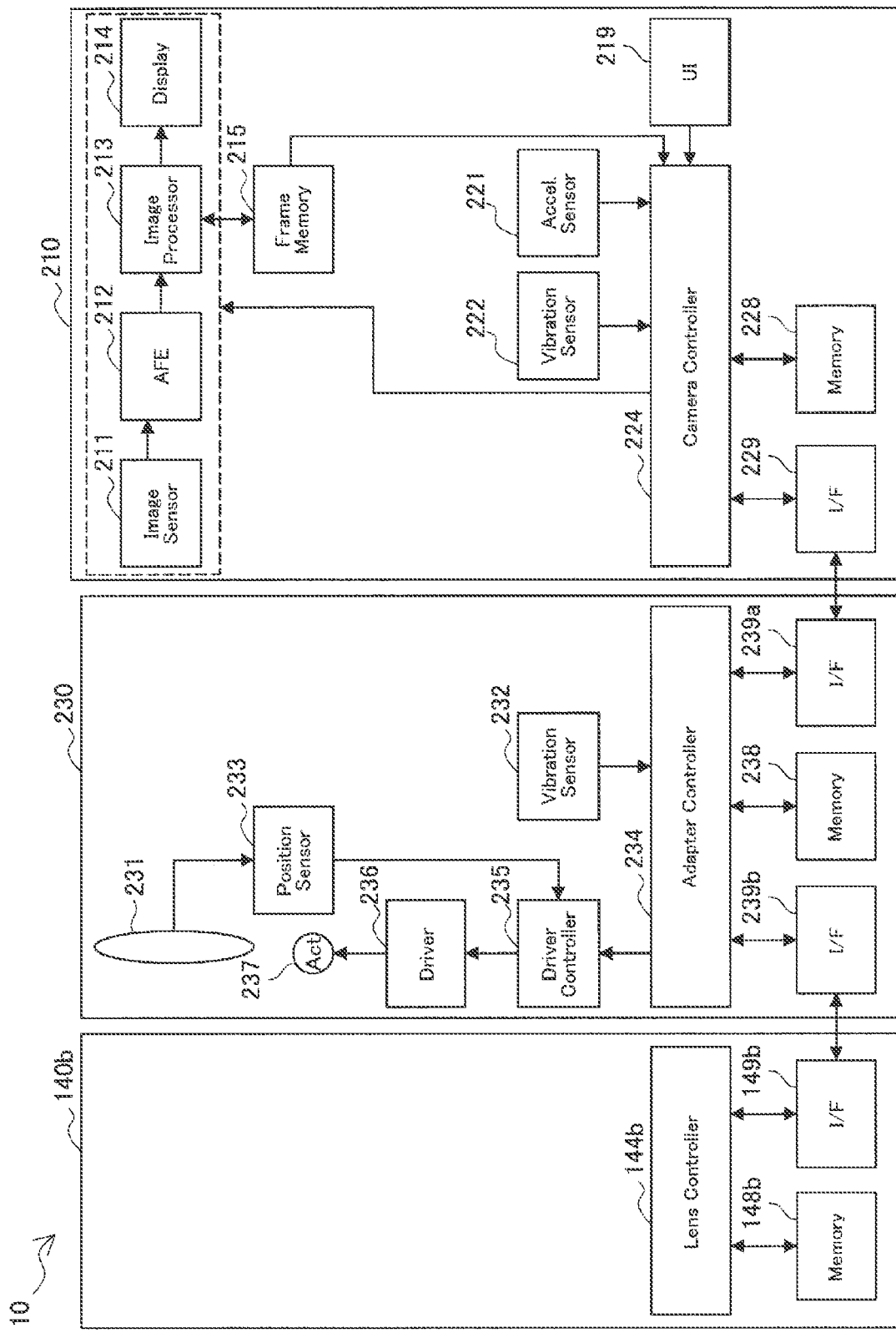

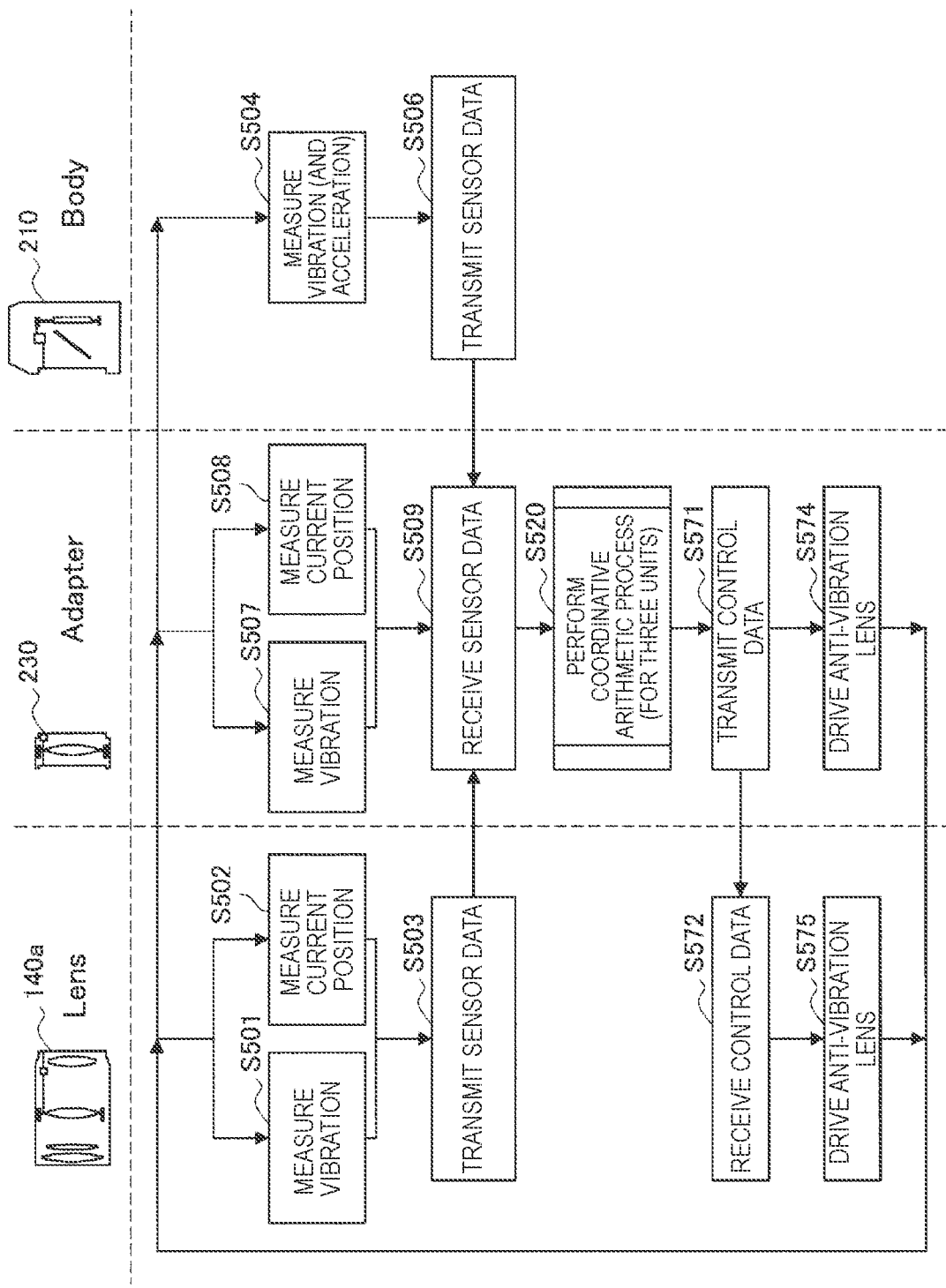

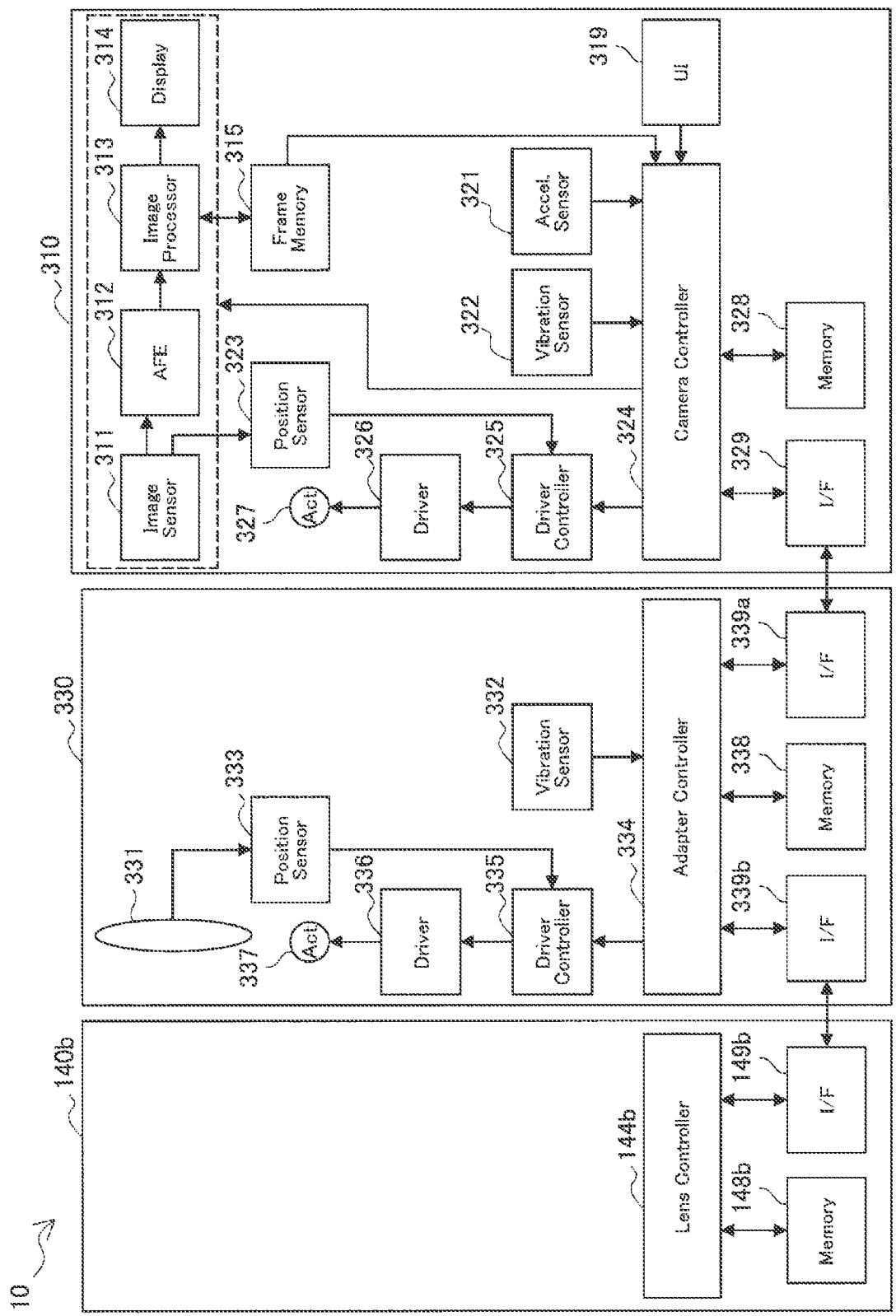

PROCESSING DEVICE, LENS ADAPTER, CAMERA BODY, AND ANTI-VIBRATION CONTROL METHOD

CROSS REFERENCE TO RELATED APPLICATIONS

This application is a U.S. National Phase of International Patent Application No. PCT/JP2017/026067 filed on Jul. 19, 2017, which claims priority benefit of Japanese Patent Application No. JP 2016-151269 filed in the Japan Patent Office on Aug. 1, 2016. Each of the above-referenced applications is hereby incorporated herein by reference in its entirety.

TECHNICAL FIELD

The present disclosure relates to a processing device, a lens adapter, a camera body, and an anti-vibration control method.

BACKGROUND ART

Technologies for detecting vibration of a camera and causing a camera system to perform an anti-vibration operation in accordance with the detected vibration for the purpose of suppressing blur in an image captured by a camera (e.g., a still camera or a video camera) are known from the past. An anti-vibration operation of a lens unit is typically performed by controlling a path of light passing through an optical system to eliminate the influence of detected vibration. The anti-vibration operation of a camera body includes displacing an image sensor so as to eliminate the influence of detected vibration. Patent Literature 1 discloses a technology of performing coordinative control of an anti-vibration operation of a lens unit and an anti-vibration operation in a camera body during an exposure period.

A lens adapter (also called a mount adapter) is a component that can be interposed between a lens unit and a camera body. A lens adapter can be used to indirectly connect a lens unit to a camera body that do not physically match each other or to provide an additional functionality (e.g., a reduction of a focal length) to a camera system. Patent Literature 2 discloses an example of a lens adapter equipped with an anti-vibration function. The lens adapter disclosed in Patent Literature 2 controls the anti-vibration operation on the basis of a gain value that is automatically set in accordance with a type of mounted lens unit.

CITATION LIST

Patent Literature

Patent Literature 1: JP 2009-265182A
Patent Literature 2: JP 2007-086679A

DISCLOSURE OF INVENTION

Technical Problem

In a case in which a plurality of units included in a camera system have an anti-vibration function, when the units respectively perform anti-vibration operations independently, the anti-vibration operations compete each other and thus the overall anti-vibration performance may deteriorate. In this case, it is desirable for any of the units playing the role of host to perform coordinative control of the operations of the plurality of units, as in the technology disclosed in Patent Literature 1. However, if the role of host is assigned uniformly to a specific unit, optimum anti-vibration performance may not be exhibited depending on the configuration of a system.

Therefore, the present disclosure proposes a mechanism that can determine the role of host to coordinate anti-vibration operations of a plurality of units more flexibly.

Solution to Problem

According to the present disclosure, there is provided a processing device including: a determination unit configured to determine, in a case in which a lens unit is mounted on a camera body via a lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

In addition, according to the present disclosure, there is provided a lens adapter including: a housing configured to be connectable to a lens unit and a camera body; and a processing device configured to determine, in a case in which the lens unit is mounted on the camera body via the lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

In addition, according to the present disclosure, there is provided a camera body including: a housing configured to be connectable to a lens adapter; and a processing device configured to determine, in a case in which a lens unit is mounted on the camera body via the lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

In addition, according to the present disclosure, there is provided an anti-vibration control method including: determining, by a processing device, whether a lens unit has an anti-vibration function of suppressing blur in a captured image in a case in which the lens unit is mounted on a camera body via a lens adapter having the anti-vibration function; and determining to cause the lens adapter to perform a coordinative arithmetic operation for anti-vibration on the basis of determination that the lens unit has the anti-vibration function.

Advantageous Effects of Invention

According to the technology of the present disclosure, anti-vibration performance of a camera system can be optimized.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17B is a block diagram illustrating an example of a detailed configuration of the camera system according to the second embodiment in which a lens unit with no anti-vibration function is mounted.

FIG. 18 is a sequence diagram illustrating an example of a flow of an anti-vibration control process in which three units according to a second embodiment are involved in a case in which a lens adapter serves as a host.

FIG. 20B is a block diagram illustrating an example of a detailed configuration of the camera system according to the third embodiment in which a lens unit with no anti-vibration function is mounted.

MODE(S) FOR CARRYING OUT THE INVENTION

Figure 1:
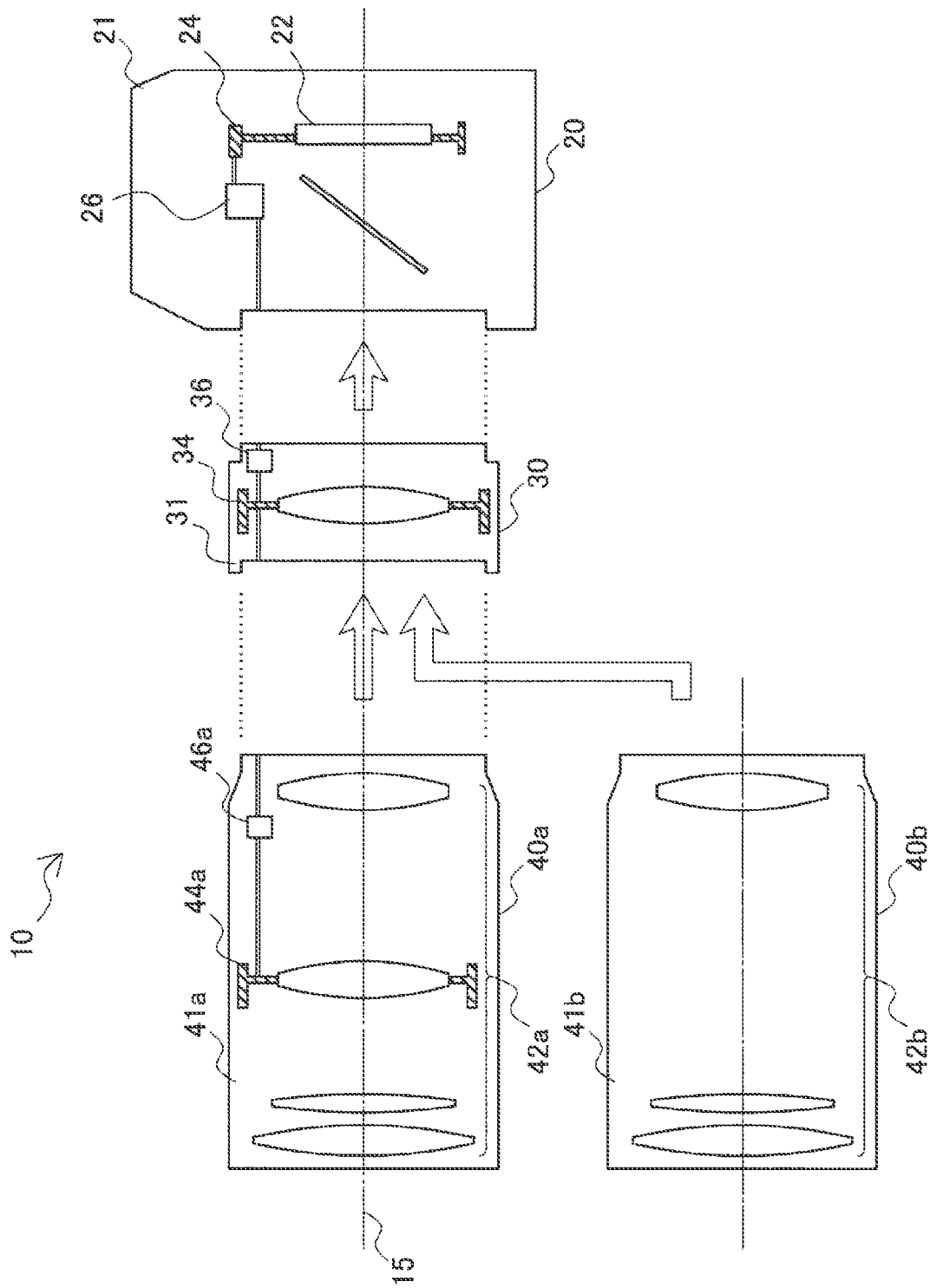
FIG. 1 is an explanatory diagram for describing an overview of a camera system.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.

1. Overview of system
2. First Embodiment
2-1. Detailed configuration of each unit
2-2. Host determination condition
2-3. Flow of process
3. Second Embodiment
3-1. Detailed configuration of each unit
3-2. Host determination condition
3-3. Flow of process
4. Third Embodiment
4-1. Detailed configuration of each unit
4-2. Host determination condition
4-3. Flow of process
5. Fourth Embodiment
5-1. Detailed configuration of each unit
5-2. Host determination condition
5-3. Flow of process
6. Conclusion

1. OVERVIEW OF SYSTEM

FIG. 1 is an explanatory diagram for describing an overview of a camera system as an example to which the technology according to the present disclosure can be applied. Referring to FIG. 1, a camera system 10 at least includes a camera body 20 and a lens adapter 30. Furthermore, the camera system 10 may include a lens unit 40a or a lens unit 40b. That is, the lens unit 40a and the lens unit 40b are interchangeable. Note that, in FIG. 1, constituent elements involved in an anti-vibration operation of the camera system 10 are mainly illustrated, and other constituent elements are omitted for the sake of simplicity of description.

The camera body 20 has a housing 21, an image sensor 22, an anti-vibration mechanism 24, and a processing device 26. The housing 21 is connectable to lens adapters of a specific type including the lens adapter 30. In addition, the housing 21 is also connectable to lens units of a specific type. That is, a lens unit can be mounted on the camera body 20 directly or via a lens adapter. The image sensor 22 is a set of imaging elements that convert a signal of light incident along an optical axis 15 into an electrical signal. The individual imaging elements typically correspond to pixels. The anti-vibration mechanism 24 suppresses blur in an image generated by the image sensor 22 by displacing or rotating the image sensor 22 under control of the processing device 26. The processing device 26 is a processor that controls anti-vibration operations for eliminating the influence of vibration of the camera system 10 detected by one or more sensors (not illustrated).

The lens adapter 30 has a housing 31, an anti-vibration mechanism 34, and a processing device 36. The housing 31 is connectable to camera bodies of a specific type including the camera body 20 at one end, and connectable to lens units of a specific type including the lens units 40a and 40b at the other end. The anti-vibration mechanism 34 suppresses blur in an image generated by the image sensor of the camera body by displacing an anti-vibration lens under control of the processing device 36. The processing device 36 is a processor that controls anti-vibration operations for eliminating the influence of vibration of the camera system 10 detected by one or more sensors (not illustrated).

The lens unit 40a has a housing 41a, a lens group 42a, an anti-vibration mechanism 44a, and a processing device 46a. The housing 41a is connectable to lens adapters and camera bodies of a specific type including the lens adapter 30. The housing 41a may be connectable directly to the camera body 20 or may not be connectable thereto. The lens group 42a includes one or more lenses and takes in light incident from outside along the optical axis 15. The anti-vibration mechanism 44a suppresses blur in an image generated by the image sensor of the camera body by displacing the anti-vibration lens under control of the processing device 46a. The processing device 46a is a processor that controls anti-vibration operations for eliminating the influence of vibration of the camera system 10 detected by one or more sensors (not illustrated).

The lens unit 40b has a housing 41b and a lens group 42b. The housing 41b is connectable to lens adapters and camera bodies of a specific type including the lens adapter 30. The housing 41b may be connectable directly to the camera body 20 or may not be connectable thereto. The lens group 42b includes one or more lenses and takes in light incident from outside along the optical axis 15. In the example of FIG. 1, the lens unit 40b does not have an anti-vibration mechanism and a processing device that controls anti-vibration operations.

In a case in which the lens unit 40a is mounted directly on the camera body 20, the camera system 10 has two processing devices 26 and 46a that can control anti-vibration operations. When the processing devices 26 and 46a respectively performs anti-vibration operations individually, the anti-vibration operations compete with each other and thus overall anti-vibration performance may deteriorate. Thus, for example, a technique of causing the processing device 26 of the camera body 20 to operate as a host (in other words, causing the processing device 26 to operate as a master and the processing device 46a to operate as a slave) is known. In this case, competition in the anti-vibration operations can be avoided if the processing device 26 performs coordinative control of the anti-vibration operation of the camera body 20 and the anti-vibration operation of the lens unit 40a. The processing device 46a of the lens unit 40a may operate as the host on behalf of the processing device 26. Generally, in a case in which there is a difference in processing performance between two processing devices, it is desirable to cause the processing device with higher processing performance (e.g., the highest processing speed, a specific arithmetic function, etc.) to operate as the host.

The lens adapter 30 can be used, for example, to connect a lens unit that is not physically compatible with the camera body 20 indirectly to the camera body 20 or to provide an additional functionality to the camera system 10. In a case in which the lens adapter 30 is connected to the camera body 20, the camera system 10 has the two processing devices 26 and 36 for anti-vibration operations. Furthermore, when the lens unit 40a is connected to the lens adapter 30, the camera system 10 has the three processing devices 26, 36, and 46a that can control anti-vibration operations. In this case, deterioration of the anti-vibration performance caused by competition in anti-vibration operations can be avoided and the processing device of any unit operates as the host and performs coordinative control of anti-vibration operations of the plurality of units. However, when the role of host is assigned uniformly to a specific unit, optimum anti-vibration performance may not be exhibited depending on a configuration of the system.

Figure 2A:
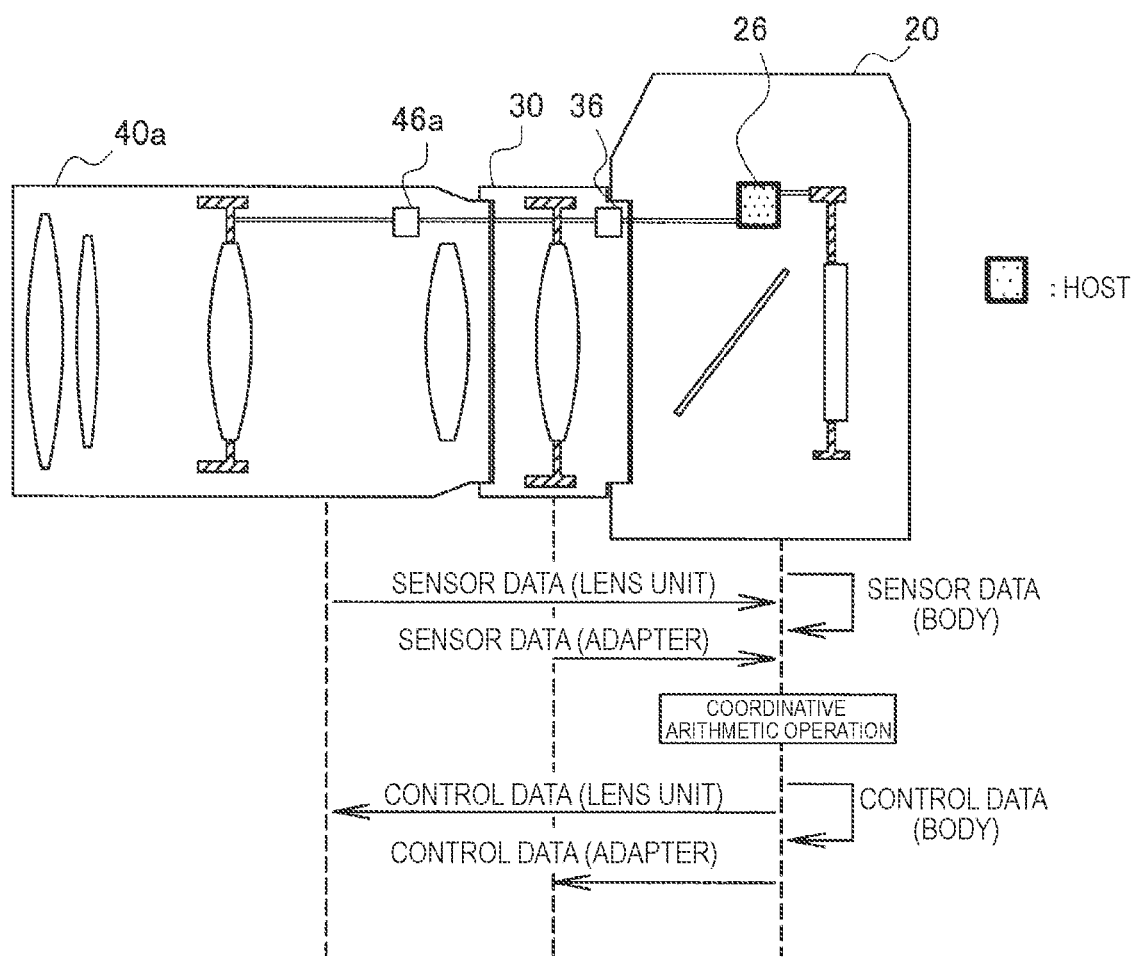
FIG. 2A is an explanatory diagram for describing an example of coordinative control of anti-vibration operations of three units.

FIG. 2A is an explanatory diagram for describing an example of coordinative control of anti-vibration operations of three units. In the example of FIG. 2A, the processing device 26 of the camera body 20 serves as the host that performs coordinative control of anti-vibration operations of the camera body 20, the lens adapter 30, and the lens unit 40a. The processing device 26 acquires sensor data indicating vibration amounts from, for example, each of sensors of the camera body 20, the lens adapter 30, and the lens unit 40a, and executes a coordinative arithmetic operation on the basis of the acquired sensor data. In addition, the processing device 26 outputs control data based on the result of the coordinative arithmetic operation to each of the anti-vibration mechanism 24 of the camera body 20, the lens adapter 30, and the lens unit 40a. In the example of FIG. 2A, communication between the units equivalent to a total of six hops is performed. More specifically, 1) sensor data of the lens unit 40a is transmitted to the lens adapter 30, 2) the sensor data of the lens unit 40a is transferred from the lens adapter 30 to the camera body 20, 3) sensor data of the lens adapter 30 is transmitted to the camera body 20, 4) control data of the lens adapter 30 is transmitted from the camera body 20 to the lens adapter 30, 5) control data of the lens unit 40a is transmitted from the camera body 20 to the lens adapter 30, and 6) the control data of the lens unit 40a is transferred from the lens adapter 30 to the lens unit 40a.

Figure 2B:
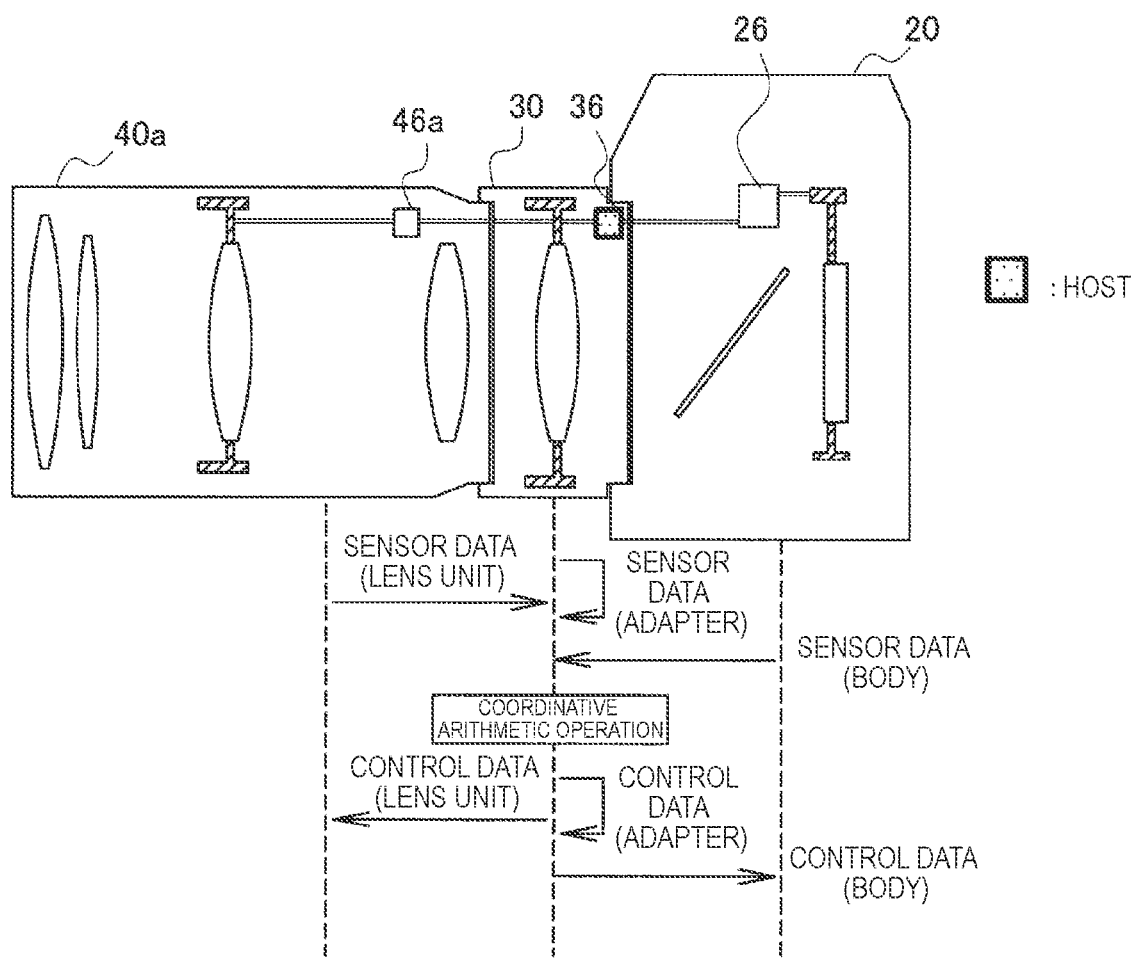
FIG. 2B is an explanatory diagram for describing another example of coordinative control of anti-vibration operations of three units.

FIG. 2B is an explanatory diagram for describing another example of coordinative control of anti-vibration operations of the three units. In the example of FIG. 2B, the processing device 36 of the lens adapter 30 is the host that performs coordinative control of anti-vibration operations of the camera body 20, the lens adapter 30, and the lens unit 40a. The processing device 36 acquires sensor data indicating vibration amounts from, for example, each of the camera body 20, a sensor of the lens adapter 30, and the lens unit 40a, and executes a coordinative arithmetic operation on the basis of the acquired sensor data. Then, the processing device 36 outputs control data based on the result of the coordinative arithmetic operation to each of the camera body 20, the anti-vibration mechanism 34 of the lens adapter 30, and the lens unit 40a. In the example of FIG. 2B, communication between the units equivalent to four hops in total is performed. More specifically, 1) sensor data of the lens unit 40a is transmitted to the lens adapter 30, 2) sensor data of the camera body 20 is transmitted to the lens adapter 30, 3) control data of the lens unit 40a is transmitted from the lens adapter 30 to the lens unit 40a, and 4) control data of the camera body 20 is transmitted from the lens adapter 30 to the camera body 20.

When the examples of FIG. 2A and FIG. 2B are compared, the example of FIG. 2A needs a longer physical communication path for coordinative control of anti-vibration operations as a whole. A long communication path causes a delay in control and deterioration in anti-vibration performance. In addition, in the example of FIG. 2A, sensor data from the lens adapter 30 and control data of the lens adapter 30 as well as sensor data from the lens unit 40a and control data of the lens unit 40a are also transmitted between the processing device 26 of the camera body 20 and the processing device 36 of the lens adapter 30. An increase of a transmission data amount causes further delay in control and imposes a load on communication resources of each unit.

Therefore, even if the processing device 26 of the camera body 20 has the highest processing performance among the two processing devices 26 and 36 (or the three processing devices 26, 36, and 46a), there are cases in which the overall anti-vibration performance of the camera system 10 is optimized when the processing device 36 of the lens adapter 30, rather than the processing device 26 of the camera body 20, operates as the host. Taking this circumstance into account, mechanisms for determining the role of host that coordinates anti-vibration operations of a plurality of units more flexibly, rather than uniformly, will be described in the following sections in detail.

2. FIRST EMBODIMENT 2-1. Detailed Configuration of Each Unit

Figure 3A:
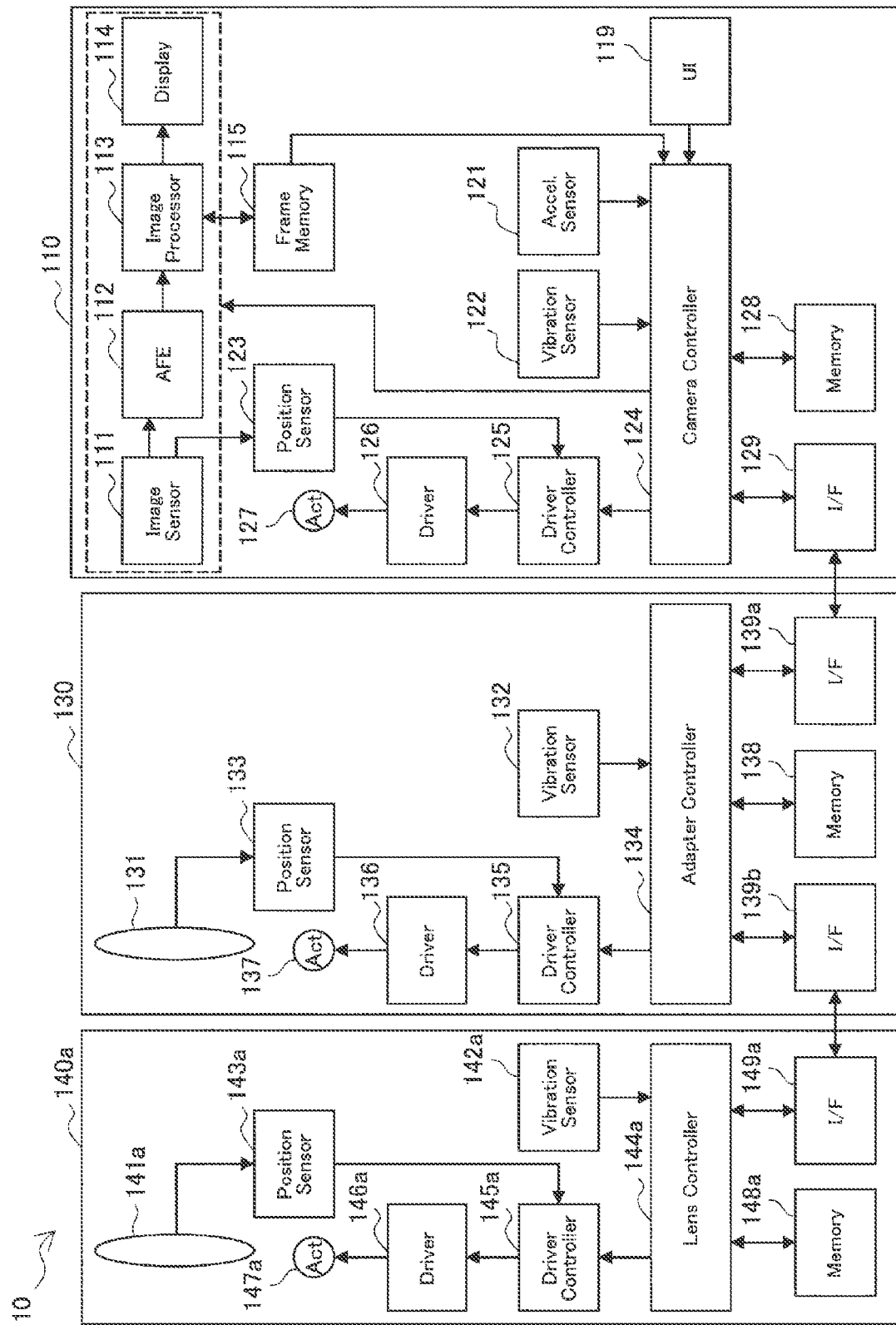
FIG. 3A is a block diagram illustrating an example of a detailed configuration of a camera system according to a first embodiment in which a lens unit with an anti-vibration function is mounted.
Figure 3B:
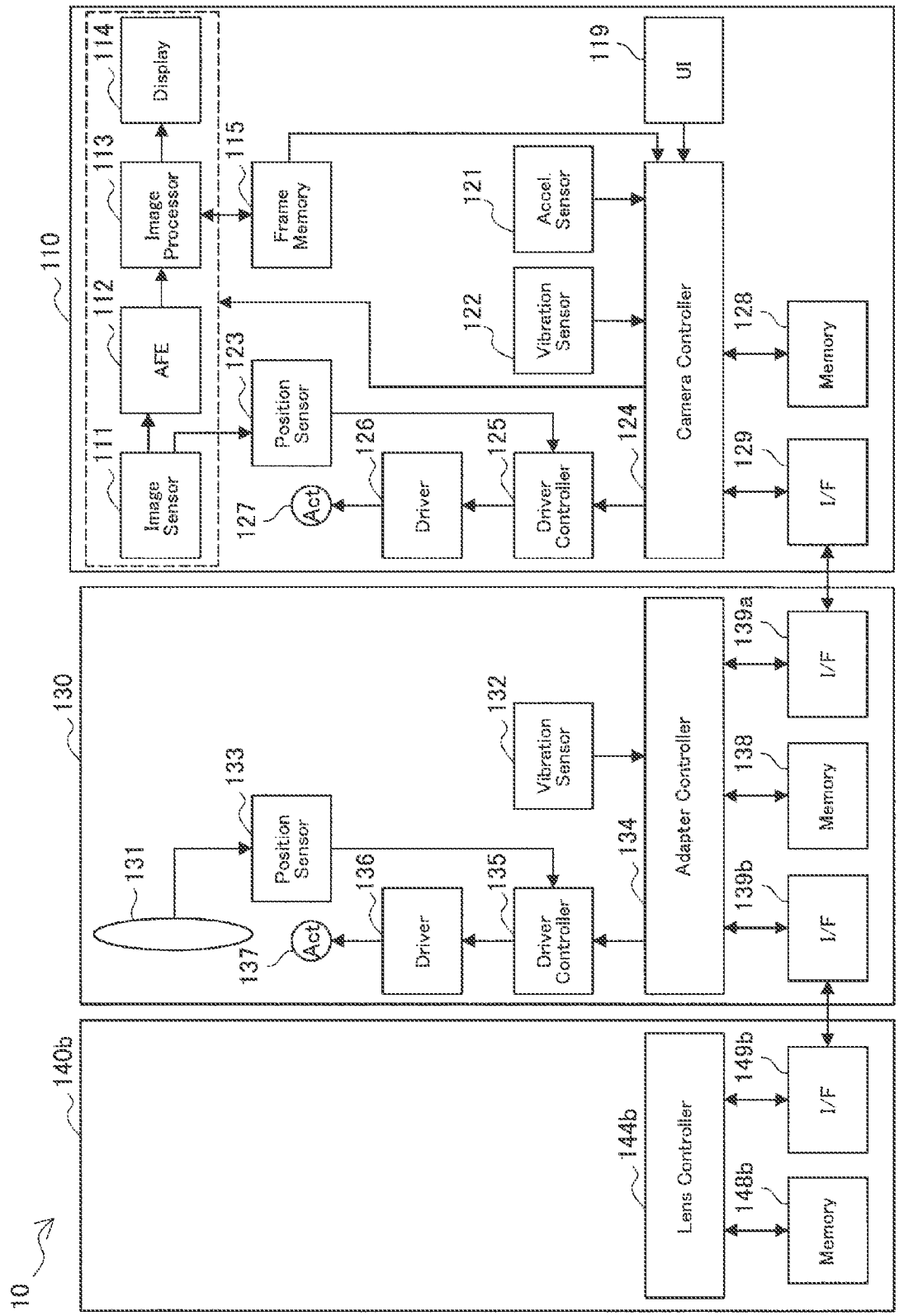
FIG. 3B is a block diagram illustrating an example of a detailed configuration of the camera system according to the first embodiment in which a lens unit with no anti-vibration function is mounted.

FIG. 3A is a block diagram illustrating an example of a detailed configuration of a camera system 10 according to a first embodiment in which a lens unit with an anti-vibration function is mounted. FIG. 3B is a block diagram illustrating an example of a detailed configuration of the camera system 10 according to the first embodiment in which a lens unit with no anti-vibration function is mounted.

Referring to FIG. 3A, the camera system 10 includes a camera body 110 and a lens adapter 130. The camera body 110 has an anti-vibration function of suppressing blur in a captured image. The lens adapter 130 also has the anti-vibration function. Furthermore, a lens unit 140a is mounted on the camera body 110 via the lens adapter 130. The lens unit 140a also has an anti-vibration function of suppressing blur in a captured image.

Figure 16:
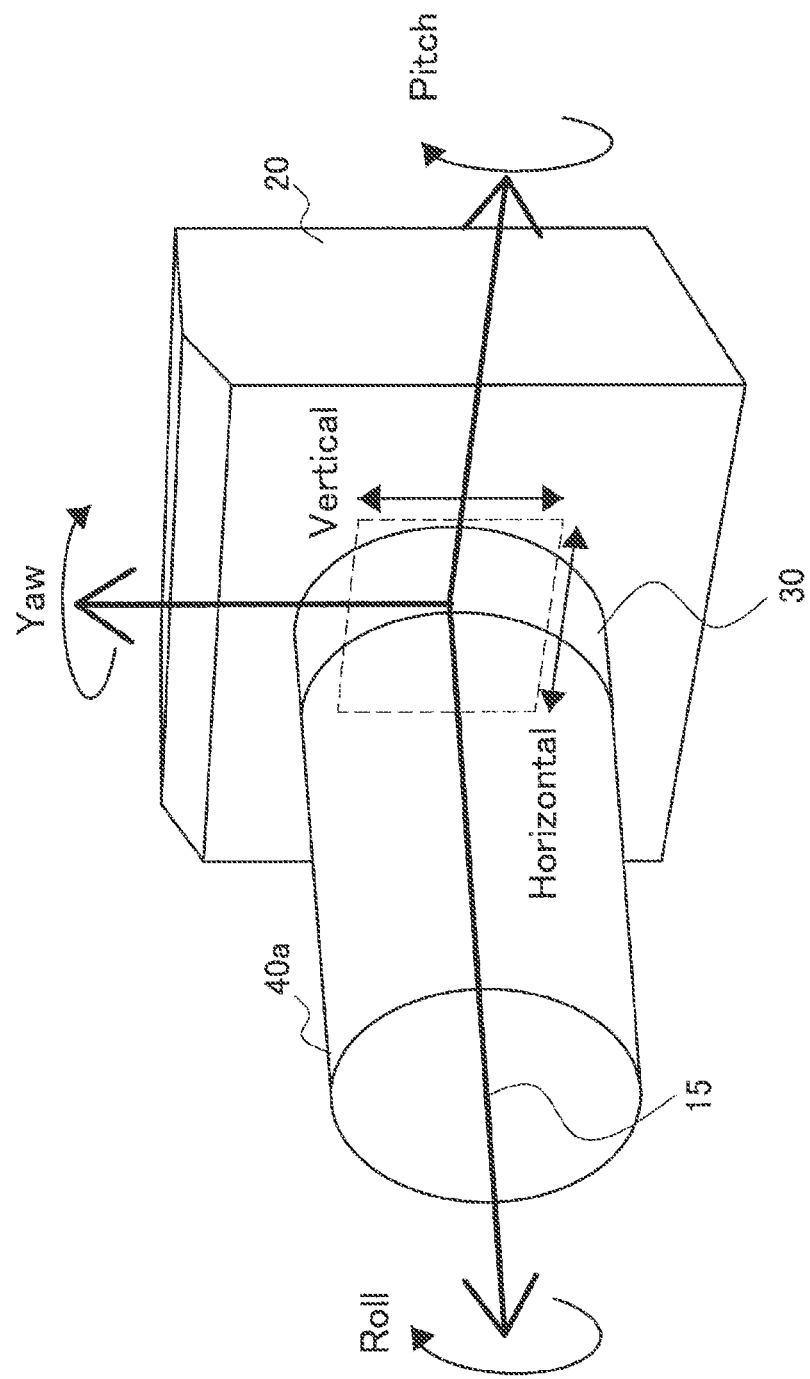
FIG. 16 is an explanatory diagram schematically illustrating yaw (Yaw), pitch (Pitch), and roll (Roll) directions and horizontal (Horizontal) and vertical (Vertical) directions of a camera system according to an embodiment.

The camera body 110 has an image sensor 111, an analog frontend (AFE) 112, an image processor 113, a display 114, a frame memory 115, a user interface (UI) 119, an acceleration sensor 121, a vibration sensor 122, a position sensor 123, a camera controller 124, a driver controller 125, a driver 126, an actuator 127, a memory 128, and an interface 129. The image sensor 111 converts a signal of light incident along an optical axis of the camera system 10 into an electrical signal. The AFE 112 performs processing of the analog domain, for example, amplification, filtering, and the like on an analog image signal that is an electrical signal input from the image sensor 111 and converts the processed analog image signal into a digital image signal. The image processor 113 performs processing of the digital domain, for example, demosaicing, gamma correction, histogram analysis, white balance adjustment, and the like on a digital image signal input from the AFE 112. The image processor 113 may superimpose an on-screen display (OSD) for displaying information regarding system settings or a user input on an image to be displayed by the display 114. The digital image signal processed by the image processor 113 is output to at least one of the display 114 or the frame memory 115. The display 114 displays an image on a screen on the basis of the digital image signal input from the image processor 113. The frame memory 115 stores the digital image signal input from the image processor 113 as image data. The UI 119 may include any types of input interface for receiving user inputs, for example, a button, a switch, a dial, a touch sensor, a voice recognition module, and the like. The acceleration sensor 121 measures an acceleration applied to the camera body 110 (at least a two-dimensional acceleration parallel to an imaging plane of the image sensor 111). The vibration sensor 122 measures angular velocities of the camera body 110 (typically, angular velocities thereof in a yaw direction, a pitch direction, and a roll direction with respect to the imaging plane and the optical axis of the image sensor 111). Note that, a sensor (e.g., a gyro sensor) that measures an angle (attitude) or an angular acceleration of the camera body, rather than an angular velocity thereof, may be used as the vibration sensor. The acceleration sensor may also be treated as a type of vibration sensor. The position sensor 123 measures a position of the image sensor 111 (typically, displacement of the camera body from a reference position along the imaging plane of the image sensor 111). In FIG. 16, examples of definition of a yaw direction, a pitch direction, a roll direction, and a horizontal and a vertical directions parallel to an imaging plane are illustrated.

The camera controller 124 is a processing device (which may also be called a processor or a micro-computer) that controls overall operations such as imaging by the camera body 110 and display and recording of images. In addition, the camera controller 124 controls anti-vibration operations performed by the camera body 110 and thereby suppresses blur in captured images. In a case in which a lens unit or a lens adapter mounted on or connected to the camera body 110 has the anti-vibration function, the camera controller 124 can also perform coordinative control of anti-vibration operations performed in the entire camera system 10. In the present embodiment, the camera controller 124 determines a mounting state of the lens adapter and the lens unit and determines the host to anti-vibration operations on the basis of the determination result, as will be described below in detail. The driver controller 125 determines a drive amount of the image sensor 111 (e.g., shift amounts of the image sensor 111 in the horizontal direction and the vertical direction along an imaging plane thereof and a rotation amount thereof in the roll direction) on the basis of a control target value instructed by the camera controller 124 and a current position input from the position sensor 123. The driver 126 outputs a drive signal indicating the drive amount determined by the driver controller 125 to the actuator 127. The actuator 127 shifts the position of the image sensor 111 in accordance with the drive signal input from the driver 126 or rotates the attitude of the image sensor 111. The memory 128 is a storage medium that stores programs and data for control of the camera controller 124. The interface 129 provides communication connection between the camera body 110 and the lens adapter or the lens unit.

The lens adapter 130 has an anti-vibration lens 131, a vibration sensor 132, a position sensor 133, an adapter controller 134, a driver controller 135, a driver 136, an actuator 137, a memory 138, a body-side interface 139*a*, and the lens-side interface 139*b*. The anti-vibration lens 131 changes a path of light passing through the optical system of the camera system 10 in accordance with its own position. The vibration sensor 132 measures angular velocities of the lens adapter 130 (typically, angular velocities in the yaw direction and the pitch direction). The position sensor 133 measures a position of the anti-vibration lens 131 (typically, displacement from a reference position in the horizontal direction and the vertical direction).

The adapter controller 134 is a processing device (which may also be called a processor or a micro-computer) that controls anti-vibration operations of the lens adapter 130 and thereby suppresses blur in captured images. In a case in which the lens unit or the camera body connected to the lens adapter 130 has an anti-vibration function, the adapter controller 134 can also perform coordinative control of anti-vibration operations performed in the entire camera system 10. In the present embodiment, in a case in which the camera controller 124 of the camera body 110 determines the lens adapter 130 as the host to anti-vibration operations, the adapter controller 134 performs coordinative arithmetic operations for anti-vibration, as will be described below in detail. The driver controller 135 determines a drive amount of the anti-vibration lens 131 (e.g., shift amounts in the horizontal direction and the vertical direction) on the basis of control target values instructed by the adapter controller 134 and a current position input from the position sensor 133. The driver 136 outputs a drive signal indicating the drive amount determined by the driver controller 135 to the actuator 137. The actuator 137 shifts the position of the anti-vibration lens 131 in accordance with the drive signal input from the driver 136. The memory 138 is a storage medium that stores programs and data for control of the adapter controller 134. The body-side interface 139*a* provides communication connection between the lens adapter 130 and the camera body 110. The lens-side interface 139*b* provides communication connection between the lens adapter 130 and the lens unit.

The lens unit 140*a* has one or more lenses (not illustrated) that take in light incident from outside on the optical system of the camera system 10, an anti-vibration lens 141*a*, a vibration sensor 142*a*, a position sensor 143*a*, a lens controller 144*a*, a driver controller 145*a*, a driver 146*a*, an actuator 147*a*, a memory 148*a*, and an interface 149*a*. The anti-vibration lens 141*a* changes a path of light passing through the optical system of the camera system 10 in accordance with its own position. The vibration sensor 142*a* measures angular velocities of the lens unit 140*a* (typically, angular velocities in the yaw direction and the pitch direction). The position sensor 143*a* measures a position of the anti-vibration lens 141*a* (typically, displacement from a reference position in the horizontal direction and the vertical direction).

The lens controller 144*a* is a processing device (which may also be called a processor or a micro-computer) that controls anti-vibration operations of the lens unit 140*a* and thereby suppresses blur in captured images. The driver controller 145*a* determines a drive amount of the anti-vibration lens 141*a* (e.g., shift amounts in the horizontal direction and the vertical direction) on the basis of a control target value instructed by the lens controller 144*a* and a current position input from the position sensor 143*a*. The driver 146*a* outputs a drive signal indicating the drive amount determined by the driver controller 145*a* to the actuator 147*a*. The actuator 147*a* shifts the position of the anti-vibration lens 141*a* in accordance with the drive signal input from the driver 146*a*. The memory 148*a* is a storage medium that stores programs and data for control of the lens controller 144*a*. The interface 149*a* provides communication connection between the lens unit 140*a* and the lens adapter.

Referring to FIG. 3B, the camera system 10 includes the camera body 110 and the lens adapter 130, similarly to the example of FIG. 3A. Furthermore, the lens unit 140*b* is mounted on the camera body 110 via the lens adapter 130. The lens unit 140*b* does not have the anti-vibration function.

The lens unit 140*b* has one or more lenses (not illustrated) that take in light incident from outside on the optical system of the camera system 10, a lens controller 144*b*, a memory 148*b*, and an interface 149*b*. The lens controller 144*b* is a processing device that controls operations of the lens unit 140*b*. The memory 148*b* is a storage medium that stores programs and data for control of the lens controller 144*b*. The interface 149*b* provides communication connection between the lens unit 140*b* and the lens adapter.

2-2. Host Determination Condition

In the present embodiment, the camera controller 124 that is the processing device of the camera body 110 determines a mounting state of the lens adapter and the lens unit and determines the host to anti-vibration operations on the basis of the determination result as described above. More specifically, in a case in which the lens unit is mounted on the camera body via the lens adapter 130 having the anti-vibration function, the camera controller 124 determines whether the mounted lens unit has the anti-vibration function. Then, in a case in which the mounted lens unit is determined to have the anti-vibration function, the camera controller 124 can determine to cause the lens adapter 130 to perform a coordinative arithmetic operation for anti-vibration. In this case, the role of host that performs coordinative control of anti-vibration operations is assigned to the lens adapter 130. On the other hand, in a case in which it is determined that the lens unit does not have the anti-vibration function, the camera controller 124 can determine to cause the camera body 110 itself to perform an arithmetic operation for anti-vibration. In this case, the role of host that performs coordinative control of anti-vibration operations is assigned to the camera body 110. Table 1 shows the host determination condition.

TABLE 1

| Host determination condition (Example 1) | | |
|---|---|---|
| | Whether lens unit has anti-vibration function | |
| | Has | Does not have |
| Host to anti-vibration operation | Lens adapter | Camera body |

Note that, in a case in which the connected lens adapter does not have the anti-vibration function or the lens unit is directly mounted without the lens adapter, the camera controller 124 may determine to cause the camera body 110 itself to perform an arithmetic operation for anti-vibration.

As another example, a condition related to, for example, communication performance may be added to the condition for assigning the role of host to the lens adapter 130. For example, in a case in which the lens unit has the anti-vibration function, the camera controller 124 may determine to cause the lens adapter 130 to perform a coordinative arithmetic operation for anti-vibration when communication performance between the lens adapter 130 and the camera body 110 satisfies a predetermined condition. Meanwhile, the camera controller 124 may determine which one of the lens adapter 130 and the camera body 110 is to be caused to perform an arithmetic operation for anti-vibration on the basis of a user input when it is determined that communication performance between the lens adapter 130 and the camera body 110 does not satisfy the predetermined condition in the case in which the lens unit has the anti-vibration function. Generally, anti-vibration by an anti-vibration lens in an optical system is suitable for suppression of blur caused by vibration with high amplitude, and thus brings about greater effects when, for example, a distant view is photographed. On the other hand, anti-vibration performed by driving an image sensor included in a camera body is suitable for suppression of blur caused by rotation around an optical axis, and thus brings about effects regardless of distance to a subject. Thus, in a case in which the lens adapter 130 and the camera body 110 are not capable of obtaining communication performance to the extent that sufficient control periods of both the lens adapter and the camera body can be secured, anti-vibration suitable for the need of a user can be provided by determining a host to anti-vibration operations depending on a user input. Table 2 shows the above-described host determination condition.

TABLE 2

Host determination condition (Example 2)

|  |  | Whether lens unit has anti-vibration function | |
|---|---|---|---|
|  |  | Has | Does not have |
| Host to anti-vibration operation | Inter-unit communication High speed | Lens adapter | Camera body |
|  | Inter-unit communication Low speed | Depending on user input | |

Similarly, in the case in which the lens unit has the anti-vibration function, the camera controller 124 may determine to cause one of the lens adapter 130 and the camera body 110 that is recommended on the basis of an imaging mode to perform an arithmetic operation for anti-vibration when it is determined that communication performance between the lens adapter 130 and the camera body 110 does not satisfy a predetermined condition. For example, in a case in which the imaging mode is a night scene mode, the camera controller 124 can determine the lens adapter 130 as the host to anti-vibration operations for the purpose of preferentially suppressing blur caused by vibration with high amplitude. In addition, in a case in which the imaging mode is a portrait mode, the camera controller 124 can determine the camera body 110 as the host to anti-vibration operations for the purpose of preferentially suppressing blur caused by rotation. By dynamically switching the host on the basis of the imaging modes as described above, anti-vibration suitable for imaging scenes can be provided, without a user input. Table 3 shows the above-described host determination condition.

TABLE 3

Host determination condition (Example 3)

|  |  | Whether lens unit has anti-vibration function | |
|---|---|---|---|
|  |  | Has | Does not have |
| Host to anti-vibration operation | Inter-unit communication High speed | Lens adapter | Camera body |
|  | Inter-unit communication Low speed | Depending on imaging mode | |

In addition, as another example, in the case in which the lens unit has the anti-vibration function, the camera controller 124 may determine to cause the lens adapter 130 to perform a coordinative arithmetic operation for anti-vibration on the condition that high speed communication is not possible between the lens adapter 130 and the camera body 110. This condition can mean the opposite way of thinking in some aspect to the conditions described in Table 2 and Table 3. However, by shortening a communication path for sensor data and control data in a case in which inter-unit communication is performed at a low speed, there is a possibility of a control delay decreasing and anti-vibration performance being improved. Table 4 shows this host determination condition.

TABLE 4

Host determination condition (Example 4)

|  |  | Whether lens unit has anti-vibration function | |
|---|---|---|---|
|  |  | Has | Does not have |
| Host to anti-vibration operation | Inter-unit communication High speed | Camera body | Camera body |
|  | Inter-unit communication Low speed | Lens adapter | |

The camera controller 124 may determine a mounting state of the lens unit and the lens adapter and determine a unit to be caused to perform an arithmetic operation for anti-vibration on the basis of the determination whether the lens unit has the anti-vibration function after power is input to the camera body 110. Accordingly, it is possible to execute coordinative anti-vibration control suitable for the configuration of the camera system 10 of the latest time point. In addition, the camera controller 124 may determine whether a new lens unit has the anti-vibration function and determine a unit to be caused to perform an arithmetic operation for anti-vibration on the basis of the determination after replacement of the lens units is detected. Accordingly, cooperative anti-vibration control suitable for functionality of the lens unit mounted at the latest time point can be executed.

2-3. Flow of Process (1) Process of Camera Body

Figure 4:
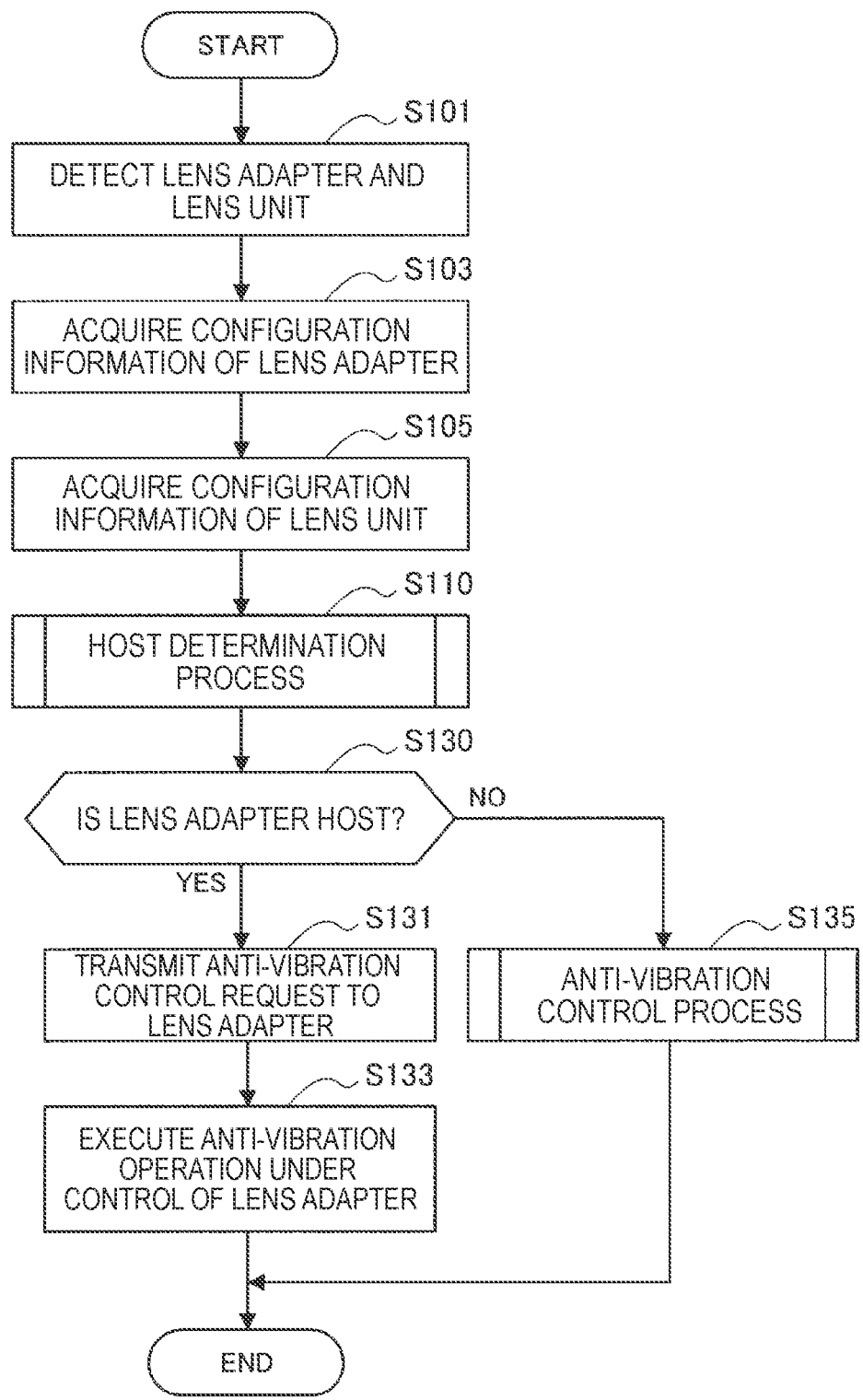
FIG. 4 is a flowchart illustrating an example of an overall flow of a process executed by a processing device of a camera body according to the first embodiment.

FIG. 4 is a flowchart illustrating an example of an overall flow of a process executed by the camera controller 124 of the camera body 110 according to the first embodiment.

Referring to FIG. 4, first, the camera controller 124 detects the lens adapter 130 through the interface 129 and the lens unit 140a or the lens unit 140b through the lens adapter 130 in Step S101.

Next, the camera controller 124 acquires configuration information of the detected lens adapter 130 in Step S103. The camera controller 124 may transmit, for example, an inquiry signal to the lens adapter 130 and receive configuration information that can be replied from the lens adapter 130 as a response to the inquiry signal. The camera controller 124 may determine that the lens adapter does not have the anti-vibration function in a case in which there is no response to the inquiry signal. In addition, the camera controller 124 may receive configuration information that can be periodically sent from the lens adapter 130. In addition, the camera controller 124 may read corresponding configuration information from a configuration information list stored in the memory 128 in advance using identification information such as a model number that can be received from the lens adapter 130. The configuration information of the lens adapter 130 indicates that the lens adapter 130 has the anti-vibration function of suppressing blur in captured images. The configuration information of the lens adapter 130 may include communication speed information indicating a communication speed supported by the lens adapter 130 or communication protocol information indicating a communication protocol supported by the lens adapter 130.

Next, the camera controller 124 acquires configuration information of the detected lens unit in Step S105. The camera controller 124 may transmit, for example, an inquiry signal to the lens unit via the lens adapter 130 and may receive configuration information that can be replied as a response to the inquiry signal. In a case in which there is no response to the inquiry signal, the camera controller 124 may determine that the lens unit does not have the anti-vibration function. In addition, the camera controller 124 may receive configuration information of the lens unit that can be periodically transferred via the lens adapter 130. In addition, the camera controller 124 may read corresponding configuration information from a configuration information list recorded in the memory 128 in advance using identification information such as a model number of the lens unit. Configuration information of the lens unit 140a indicates that the lens unit 140a has the anti-vibration function, and configuration information of the lens unit 140b indicates that the lens unit 140b does not have the anti-vibration function.

Next, the camera controller 124 executes a host determination process using the configuration information of the lens adapter and the lens unit and determines a unit to be caused to perform an arithmetic operation for anti-vibration in Step S110. Several examples of the host determination process will be described below in detail.

Processes performed thereafter branch depending on a result of the host determination process (Step S130). For example, in a case in which it is determined to cause the lens adapter 130 to perform an arithmetic operation for anti-vibration, the camera controller 124 transmits an anti-vibration control request to the lens adapter 130 in Step S131. Then, the camera controller 124 executes an anti-vibration operation of the camera body 110 under control of the lens adapter 130 in Step S133. On the other hand, in a case in which it is determined to cause the camera body 110 to perform an arithmetic operation for anti-vibration, the camera controller 124 executes an anti-vibration control process and controls anti-vibration operations of the camera body 110 as well as the lens adapter 130 in Step S135. Note that, the anti-vibration operation of Step S133 or the anti-vibration control process of Step S135 may be performed after some time has elapsed from the determination of the host or the transmission of the anti-vibration control request (e.g., at the time of imaging, auto-focus driving, or the like).

(2) Process of Lens Adapter

Figure 5:
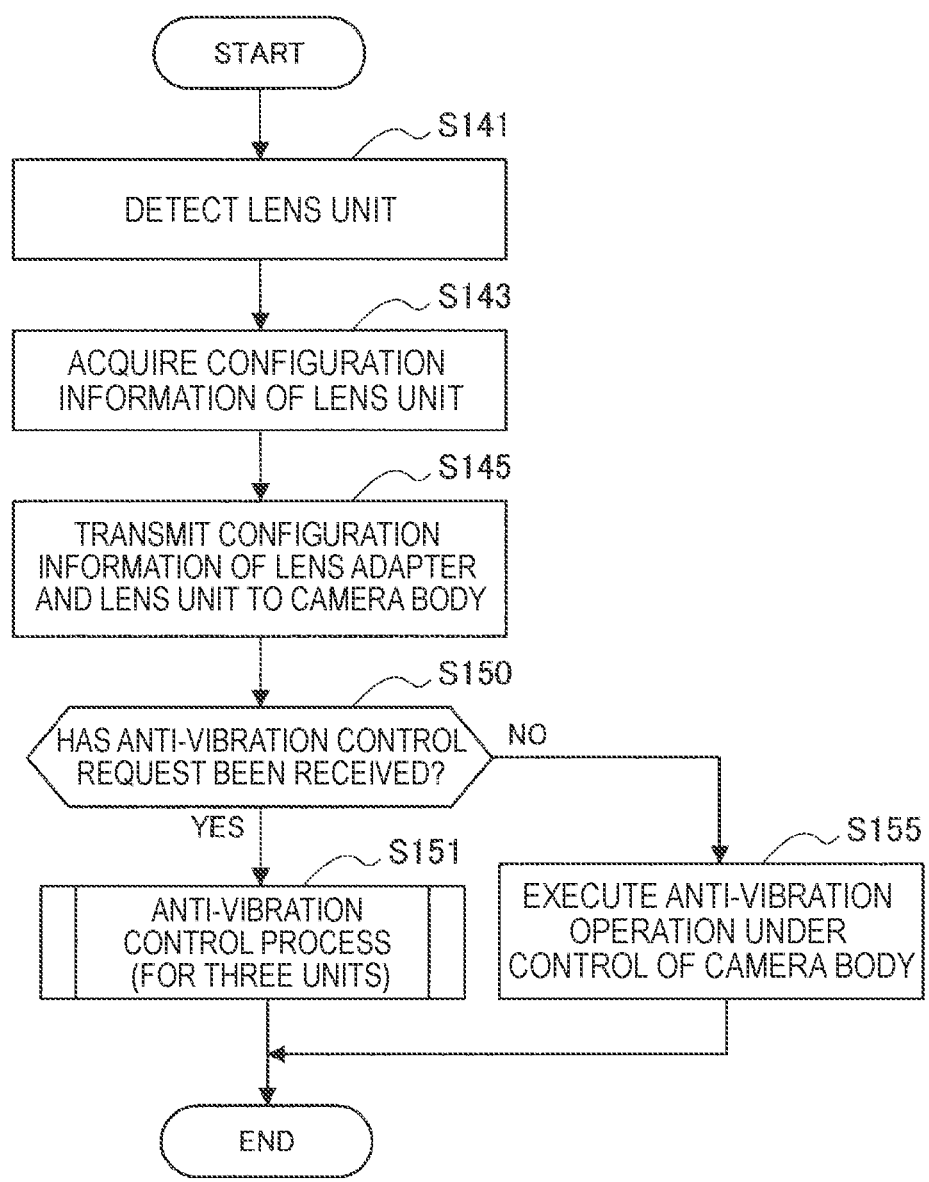
FIG. 5 is a flowchart illustrating an example of an overall flow of a process executed by a processing device of a lens adapter according to the first embodiment.

FIG. 5 is a flowchart illustrating an example of an overall flow of a process executed by the adapter controller 134 of the lens adapter 130 according to the first embodiment.

Referring to FIG. 5, first, the adapter controller 134 detects a lens unit via the lens-side interface 139b in Step S141.

Next, the adapter controller 134 acquires configuration information of the detected lens unit in Step S143. The adapter controller 134 may receive, for example, configuration information as a response to an inquiry signal transmitted to the lens unit or configuration information that can be periodically sent from the lens unit. In a case in which there is no response to the inquiry signal for a predetermined period of time, the adapter controller 134 may determine that the lens unit does not have the anti-vibration function. In addition, the adapter controller 134 may read corresponding configuration information from a configuration information list stored in the memory 138 in advance using identification information such as a model number of the lens unit.

Next, the adapter controller 134 transmits configuration information of the lens adapter 130 to the camera body 110 and configuration information of the lens unit to the camera body in Step S145.

Processes performed thereafter branch depending on a result of the host determination process executed by the camera body 110. For example, when it is determined to cause the lens adapter 130 to perform an arithmetic operation for anti-vibration and an anti-vibration control request is received in Step S150 as the result, the adapter controller 134 executes an anti-vibration control process in Step S151 and thereby controls anti-vibration operations of the camera body 110, the lens adapter 130, and the lens unit. On the other hand, when it is determined to cause the camera body 110 to perform an arithmetic operation for anti-vibration, no anti-vibration control request is received. In this case, the adapter controller 134 executes an anti-vibration operation of the lens adapter 130 under control of the camera body 110 in Step S155. Note that, the anti-vibration control process of Step S151 or the anti-vibration operation of Step S155 may be performed after some time has elapsed from the reception of an anti-vibration control request (e.g., at the time of imaging, auto-focus driving, or the like).

(3) Host Determination Process—First Example

Figure 6:
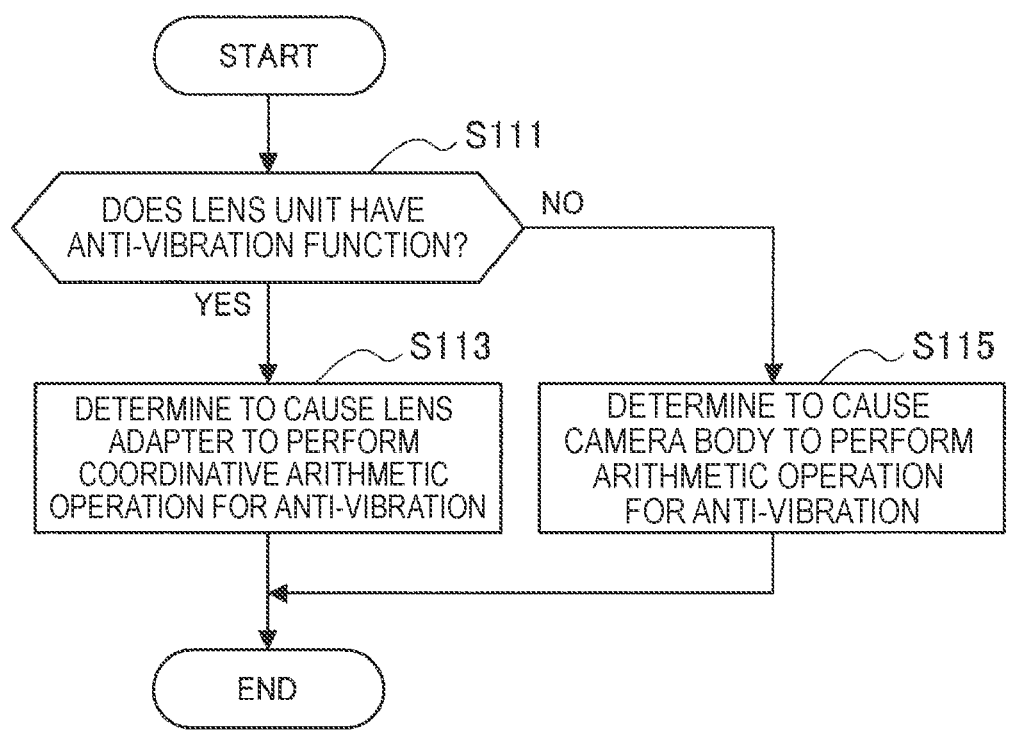
FIG. 6 is a flowchart illustrating a first example of a flow of a host determination process.

FIG. 6 is a flowchart illustrating a first example of the flow of the host determination process that can be executed by the camera controller 124 of the camera body 110 in Step S110 of FIG. 4. The host determination process described here corresponds to the host determination condition described above using Table 1.

Referring to FIG. 6, first, the camera controller 124 determines whether the lens unit mounted thereto via the lens adapter 130 has the anti-vibration function on the basis of the configuration information of the lens unit in Step S111.

In the case in which the lens unit has the anti-vibration function, the camera controller 124 determines to cause the lens adapter 130 to perform a coordinative arithmetic operation for anti-vibration in Step S113. On the other hand, in the case in which the lens unit does not have the anti-vibration function, the camera controller 124 determines to cause the camera body 110 to perform an arithmetic operation for anti-vibration in Step S115 (i.e., the operation is performed by the camera controller 124 itself).

(4) Host Determination Process—Second Example

Figure 7A:
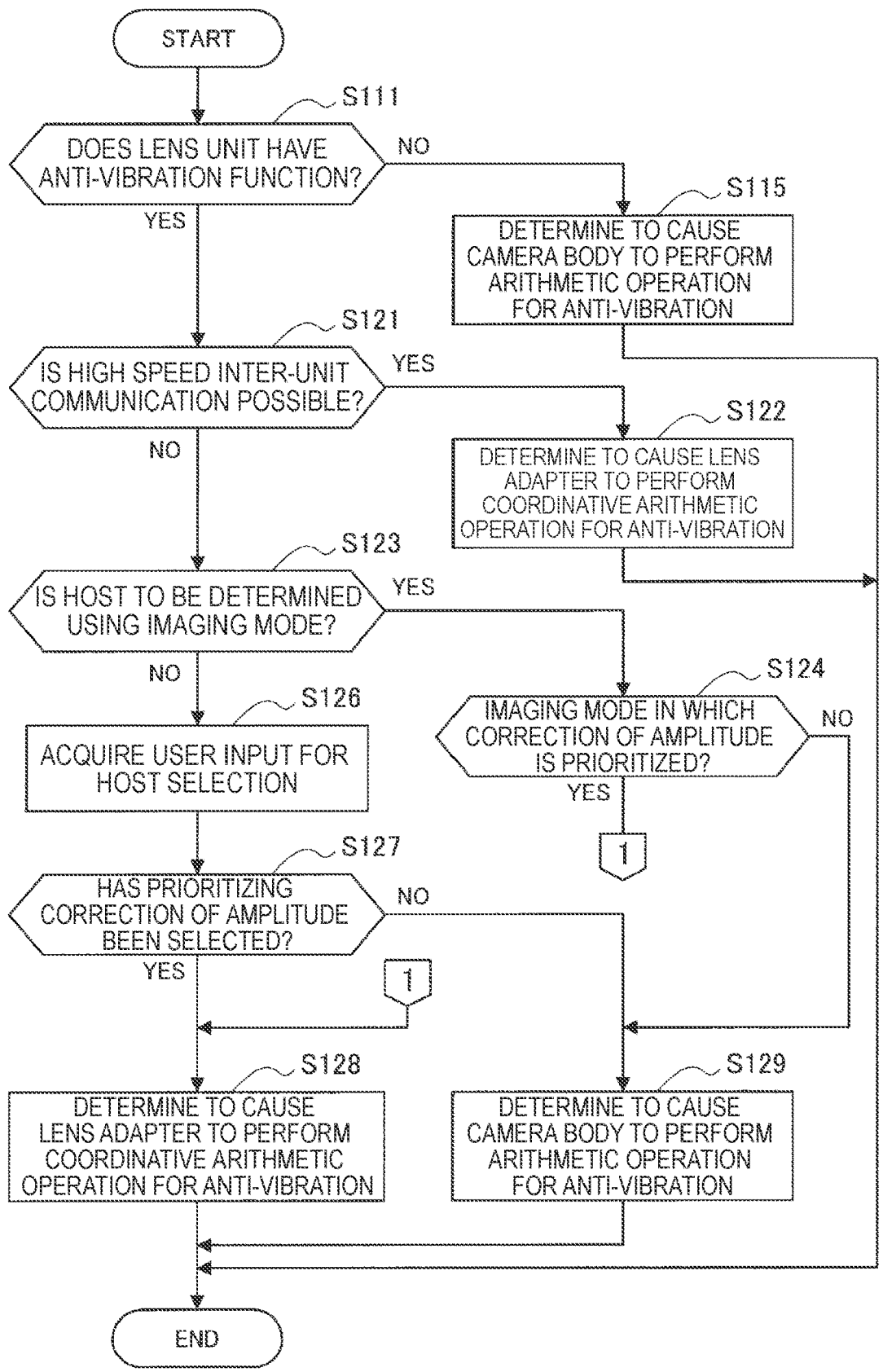
FIG. 7A is a flowchart illustrating a second example of a flow of a host determination process.

FIG. 7A is a flowchart illustrating a second example of the flow of the host determination process that can be executed by the camera controller 124 of the camera body 110 in Step S110 of FIG. 4. The host determination process described here corresponds to a combination of the host determination conditions described above using Table 2 and Table 3.

Referring to FIG. 7A, first, the camera controller 124 determines whether the lens unit mounted thereto via the lens adapter 130 has the anti-vibration function on the basis of the configuration information of the lens unit in Step S111. In the case in which the lens unit does not have the anti-vibration function, the camera controller 124 determines to cause the camera body 110 to perform an arithmetic operation for anti-vibration in Step S115.

On the other hand, in the case in which the lens unit has the anti-vibration function, the camera controller 124 further determines whether communication performance between the lens adapter 130 and the camera body 110 satisfies a predetermined condition (e.g., whether high speed inter-unit communication is possible) in Step S121. As an example, the predetermined condition may be a communication speed supported by the lens adapter 130 and the camera body 110 being higher than a predetermined speed threshold value. As another example, the predetermined condition may be that a communication protocol supported by the lens adapter 130 and the camera body 110 matches a predetermined protocol that provides high speed communication. A communication speed or a communication protocol supported by a certain unit may be described in configuration information of the unit. Instead, a communication speed may be measured by transmitting and receiving speed inspection signals between the units. In a case in which communication performance between the lens adapter 130 and the camera body 110 satisfies the predetermined condition, the camera controller 124 determines to cause the lens adapter 130 to perform a coordinative arithmetic operation for anti-vibration in Step S122.

On the other hand, in a case in which communication performance between the lens adapter 130 and the camera body 110 does not satisfy the predetermined condition, the camera controller 124 determines whether the host is to be determined using an imaging mode or the host is to be determined on the basis of a user input in Step S123.

In a case in which a system setting indicates that the host should be determined using an imaging mode, for example, the camera controller 124 determines the host on the basis of the imaging mode (Step S124). More specifically, in a case in which an imaging mode (e.g., a night scene mode, a landscape mode, etc.) in which correction of high amplitude is prioritized is set, for example, the camera controller 124 can determine to cause the lens adapter 130 to perform a coordinative arithmetic operation for anti-vibration in Step S128. On the other hand, in a case in which an imaging mode (e.g., a portrait mode, etc.) in which correction of rotation is prioritized is set, the camera controller 124 can determine to cause the camera body 110 to perform an arithmetic operation for anti-vibration in Step S129. The imaging modes may be set in advance or set at the time point of Step S124 (on the basis of a user input or automatically by a system).

In addition, in a case in which the system setting indicates that the host is to be determined on the basis of a user input, the camera controller 124 causes, for example, an option to be displayed on an OSD for a user and acquires a user input for selection of the host in Step S126. The displayed option mentioned here may be one for selecting one of correction of amplitude and correction of rotation to be prioritized, or one for selecting one of the lens adapter 130 and the camera body 110 to serve as the host. In a case in which the user input acquired via the UI 119 indicates that, for example, the correction of amplitude should be prioritized (Step S127), the camera controller 124 can determine to cause the lens adapter 130 to perform a coordinative arithmetic operation for anti-vibration in Step S128. On the other hand, otherwise, the camera controller 124 can determined to cause the camera body 110 to perform an arithmetic operation for anti-vibration in Step S129.

Note that, in a case in which high speed inter-unit communication is not possible in the example of FIG. 7A, the conditional branch of Step S123 may be omitted and the host may be determined only on the basis of the user input (the host determination condition of Table 2). Likewise, in the case in which high speed inter-unit communication is not possible, the host may be determined only on the basis of an imaging mode (the host determination condition of Table 3). In addition, in a case in which the imaging mode is switched during an operation, the entire host determination process illustrated in FIG. 7A or the determination from Step S124 may be executed again.

(5) Host Determination Process—Third Example

Figure 7B:
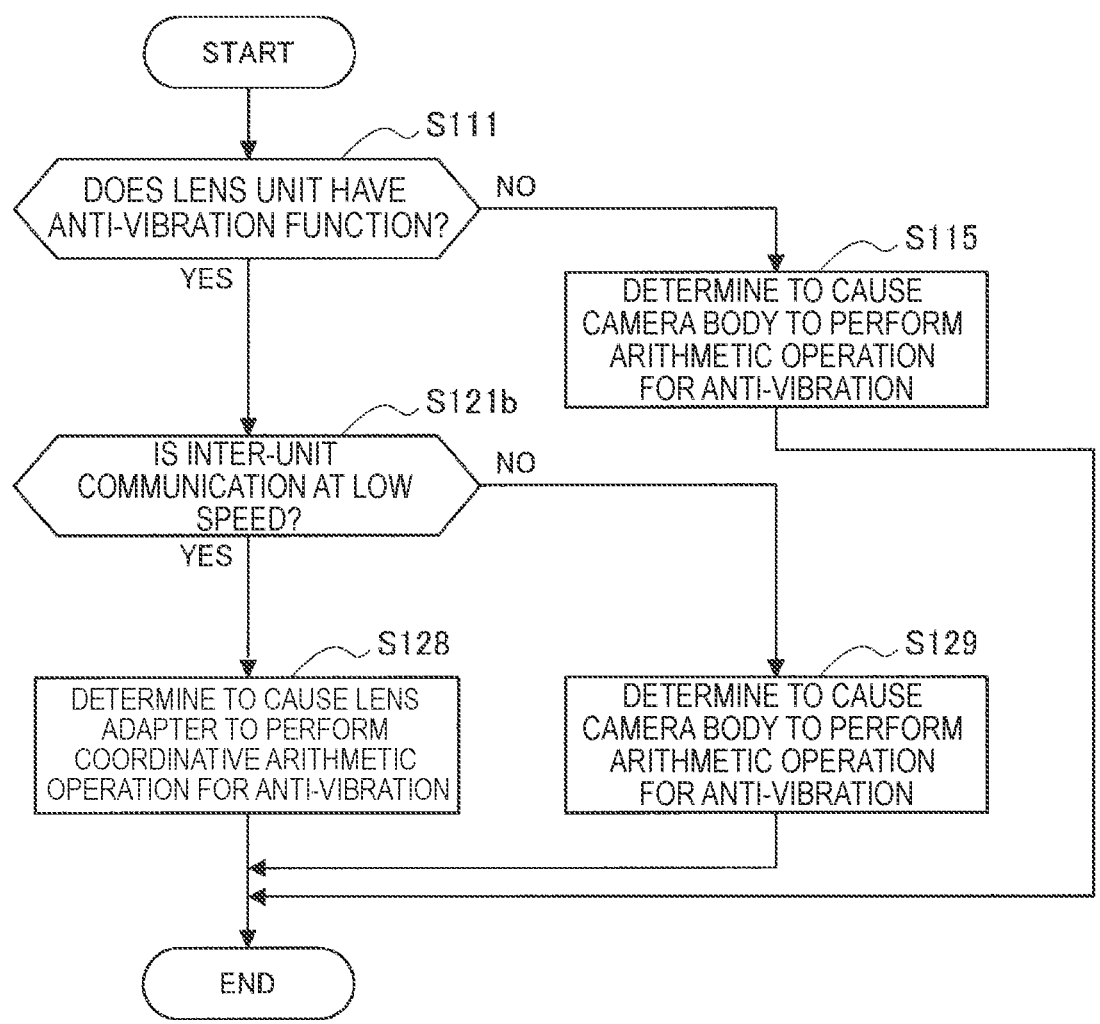
FIG. 7B is a flowchart illustrating a third example of a flow of a host determination process.

FIG. 7B is a flowchart illustrating a third example of the flow of the host determination process that can be executed by the camera controller 124 of the camera body 110 in Step S110 of FIG. 4. The host determination process described here corresponds to the host determination condition described above using Table 4.

Referring to FIG. 7B, first, the camera controller 124 determines whether the lens unit mounted thereto via the lens adapter 130 has the anti-vibration function on the basis of the configuration information of the lens unit in Step S111. In the case in which the lens unit does not have the anti-vibration function, the camera controller 124 determines to cause the camera body 110 to perform an arithmetic operation for anti-vibration in Step S115.

On the other hand, in a case in which the lens unit has the anti-vibration function, the camera controller 124 further determines whether communication performance between the lens adapter 130 and the camera body 110 satisfies a predetermined condition (e.g., whether inter-unit communication is performed at a low speed) in Step S121*b*. In a case in which the communication performance between the lens adapter 130 and the camera body 110 satisfies the predetermined condition, the camera controller 124 determines to cause the lens adapter 130 to perform a coordinative arithmetic operation for anti-vibration in Step S128.

On the other hand, in a case in which the communication performance between the lens adapter 130 and the camera body 110 does not satisfy the predetermined condition, the camera controller 124 determines to cause the camera body 110 to perform an arithmetic operation for anti-vibration in Step S129.

(6) Anti-Vibration Control Process by Lens Adapter (for Three Units)

Figure 8:
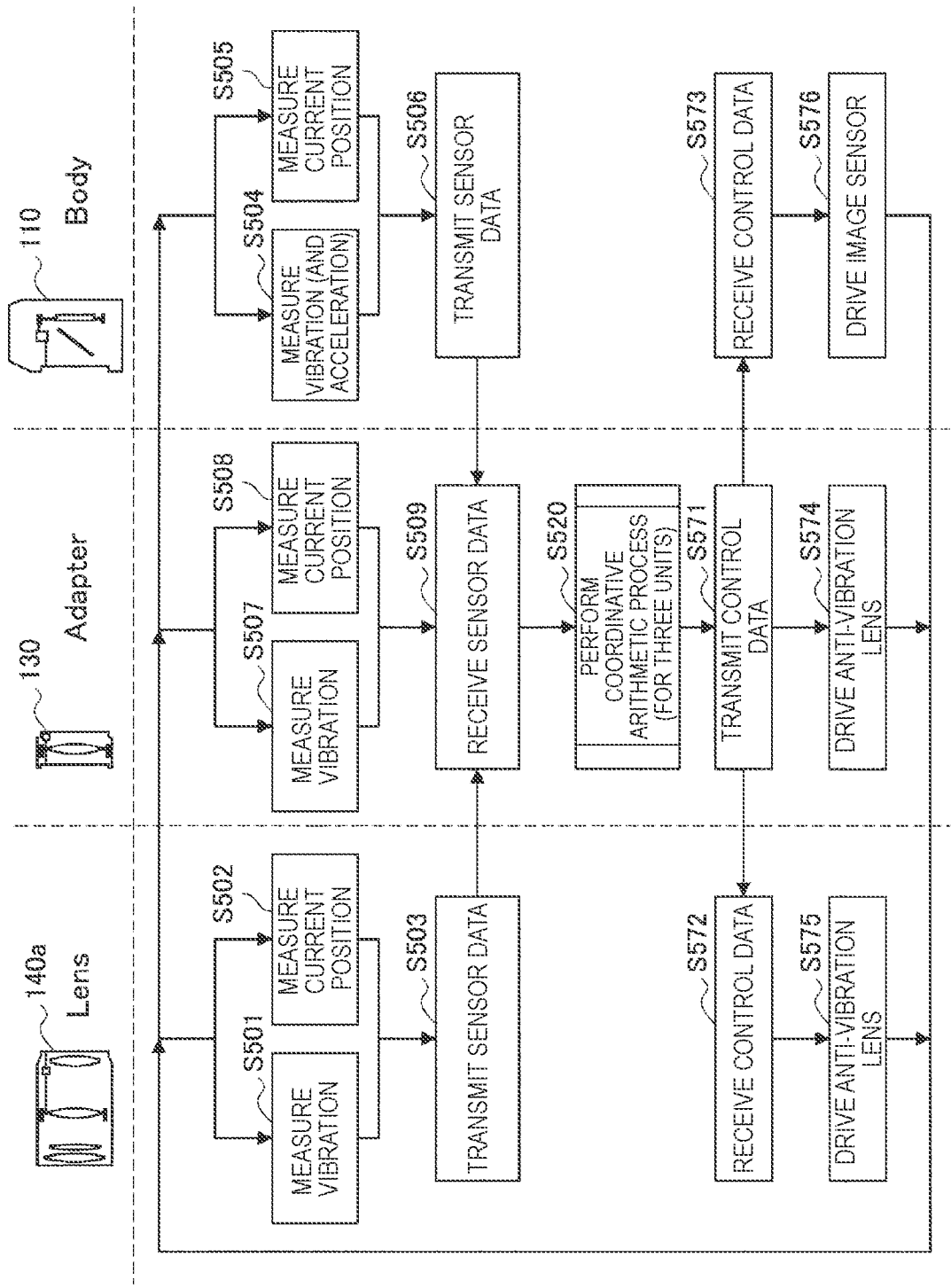
FIG. 8 is a sequence diagram illustrating an example of a flow of an anti-vibration control process in which three units are involved in a case in which the lens adapter serves as a host.

FIG. 8 is a sequence diagram illustrating an example of the flow of the anti-vibration control process that can be executed in Step S151 of FIG. 5 in which the three units are involved in a case in which the lens adapter serves as the host. The camera body 110, the lens adapter 130, and the lens unit 140a are involved in the anti-vibration control process illustrated in FIG. 8.

Referring to FIG. 8, first, the vibration sensor 142a of the lens unit 140a measures vibration of the lens unit 140a in Step S501. The position sensor 143a of the lens unit 140a measures the current position of the anti-vibration lens 141a in Step S502. The lens controller 144a transmits sensor data in which the measurement results acquired from the sensors are described to the lens adapter 130 in Step S503.

The vibration sensor 122 (and the acceleration sensor 121) of the camera body 110 measures vibration (and an acceleration) of the camera body 110 in Step S504. The position sensor 123 of the camera body 110 measures the current position of the image sensor 111 in Step S505. The camera controller 124 transmits sensor data in which the measurement results acquired from the sensors are described to the lens adapter 130 in Step S506.

The vibration sensor 132 of the lens adapter 130 measures vibration of the lens adapter 130 in Step S507. The position sensor 133 of the lens adapter 130 measures the current position of the anti-vibration lens 131 in Step S508. The adapter controller 134 acquires the measurement results from the sensors and receives the sensor data from the lens unit 140a and the sensor data from the camera body 110 in Step S509.

The adapter controller 134 executes a coordinative arithmetic process for an anti-vibration operation in Step S520 on the basis of the sensor data collected in Step S509. Several examples of the coordinative arithmetic process executed here will be described below in more detail.

A coordinative arithmetic operation typically includes calculation of one or more control quantities for each of a plurality of anti-vibration functions on the basis of vibration quantities detected by one or more of the lens unit 140a, the lens adapter 130, and the camera body 110. A vibration amount may be expressed at least as an angular velocity in a yaw direction and a pitch direction, an angle as an integration of an angular velocity, or displacement corresponding to an angle. For example, a control quantity for the anti-vibration function of the lens unit 140a may be shift amounts of the anti-vibration lens 141a in the directions orthogonal to the optical axis (in the horizontal and vertical directions). A control quantity for the anti-vibration function of the lens adapter 130 may be shift amounts of the anti-vibration lens 131 in the directions orthogonal to the optical axis (in the horizontal and vertical directions). A control quantity for the anti-vibration function of the camera body 110 may include shift amount of the image sensor 111 in the directions orthogonal to the optical axis (in the horizontal and vertical directions). In a case in which a detected vibration amount also includes an angular velocity in the roll direction or an angle as an integration of the angular velocity, a control quantity for the anti-vibration function of the camera body 110 may further include a rotation amount of the image sensor 111 in the roll direction (i.e., an amount of rotation around the optical axis). In addition, a translational acceleration detected by the camera body 110 may be included in the calculation of the control quantities.

The adapter controller 134 executes the above-described coordinative arithmetic operation and thereby distributes a total control quantity for eliminating vibration of the camera system 10 as a whole to the above-described control quantities for the plurality of anti-vibration functions. In addition, the adapter controller 134 transmits control data in which the control quantity for the anti-vibration function of the lens unit 140a is described to the lens unit 140a and transmits control data in which the control quantity for the anti-vibration function of the camera body 110 is described to the camera body 110 in Step S571.

The lens controller 144a of the lens unit 140a receives the control data from the lens adapter 130 serving as the host in Step S572, and drives the anti-vibration lens 141a in accordance with the received control data in Step S575.

The adapter controller 134 of the lens adapter 130 drives the anti-vibration lens 131 in accordance with the control quantity divided by itself to the lens adapter 130 in Step S574.

The camera controller 124 of the camera body 110 receives the control data from the lens adapter 130 serving as the host in Step S573 and drives the image sensor 111 in accordance with the received control data in Step S576.

(7) Anti-Vibration Control Process by Camera Body (for Two Units)

Figure 9:
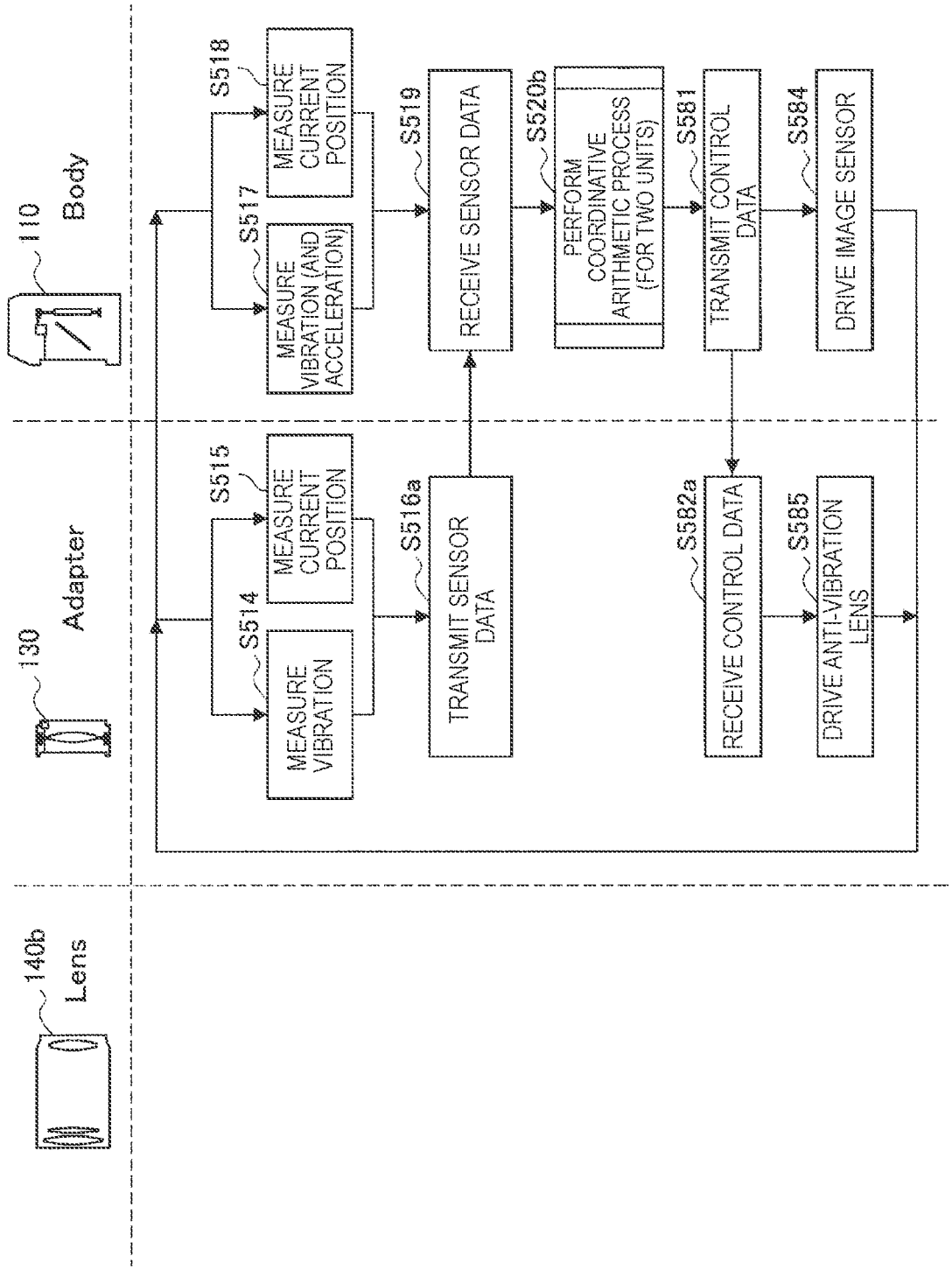
FIG. 9 is a sequence diagram illustrating an example of a flow of an anti-vibration control process in which two units are involved in a case in which the camera body serves as a host.

FIG. 9 a sequence diagram illustrating an example of the flow of the anti-vibration control process that can be executed in Step S135 of FIG. 4 in which two units are involved in a case in which the camera body serves as the host. The camera body 110 and the lens adapter 130 are involved in the anti-vibration control process illustrated in FIG. 9.

Referring to FIG. 9, first, the vibration sensor 132 of the lens adapter 130 measures vibration of the lens adapter 130 in Step S514. The position sensor 133 of the lens adapter 130 measures the current position of the anti-vibration lens 131 in Step S515. The adapter controller 134 transmits sensor data in which the measurement results acquired from the sensors are described to the camera body 110 in Step S516a.

The vibration sensor 122 (and the acceleration sensor 121) of the camera body 110 measures vibration (and an acceleration) of the camera body 110 in Step S517. The position sensor 123 of the camera body 110 measures the current position of the image sensor 111 in Step S518. The camera controller 124 acquires the measurement results from the sensors and receives the sensor data from the lens adapter 130 in Step S519.

The camera controller 124 executes a coordinative arithmetic process for anti-vibration operations in Step S520b on the basis of the sensor data collected in Step S519, and divides a total control quantity for eliminating vibration of the camera system 10 as a whole into control quantities for the plurality of anti-vibration functions. Then, the camera controller 124 transmits control data in which the control quantity for the anti-vibration function of the lens adapter 130 is described to the lens adapter 130 in Step S581.

The adapter controller 134 of the lens adapter 130 receives the control data from the camera body 110 serving as the host in Step S582a and drives the anti-vibration lens 131 in accordance with the received control data in Step S585.

The camera controller 124 of the camera body 110 drives the image sensor 111 in accordance with the control quantity divided by itself to the camera body 110 in Step S584.

(8) Anti-Vibration Control Process by Camera Body (for Three Units)

Figure 10:
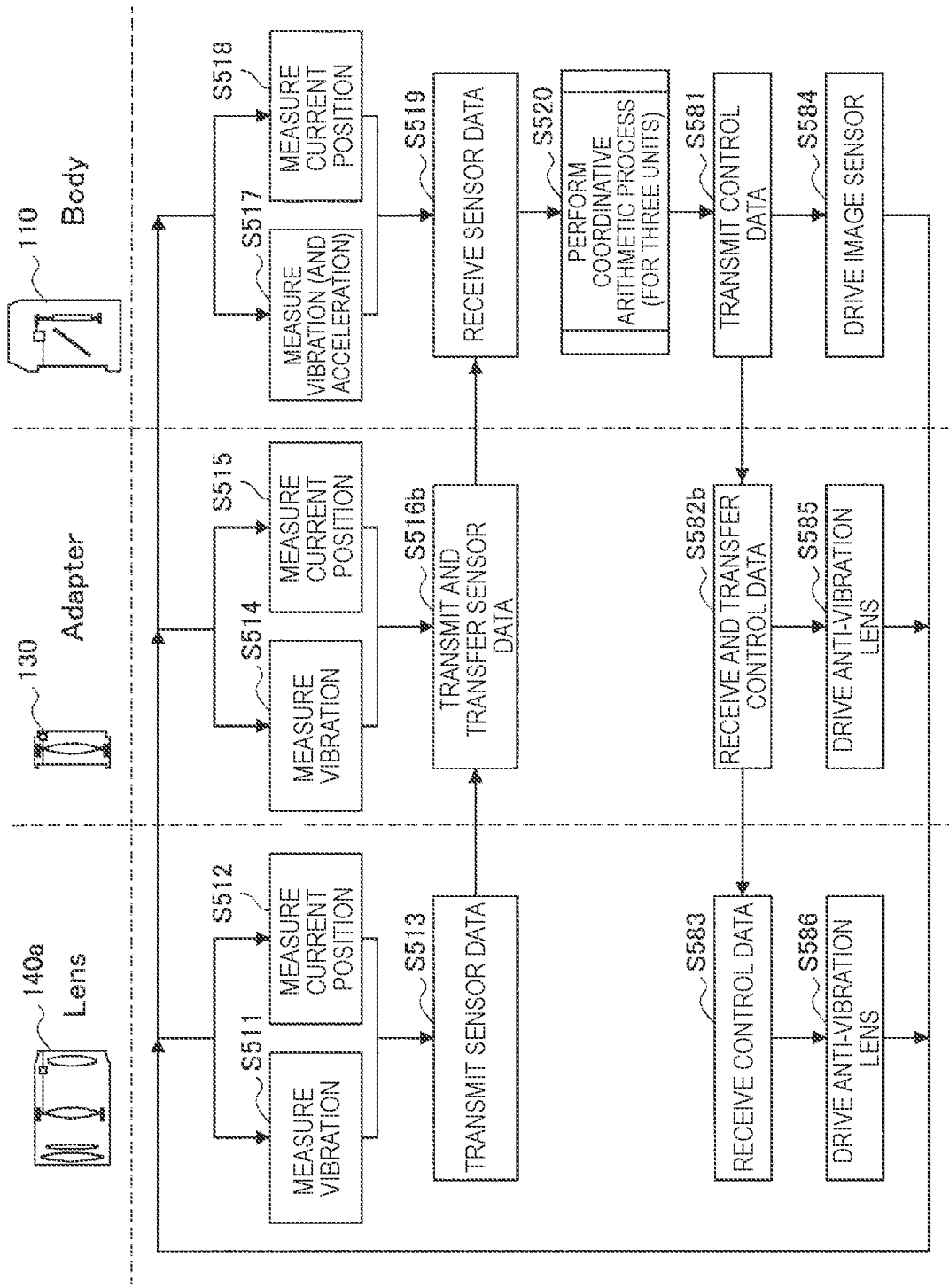
FIG. 10 is a sequence diagram illustrating an example of a flow of an anti-vibration control process in which three units are involved in a case in which the camera body serves as a host.

FIG. 10 a sequence diagram illustrating an example of the flow of the anti-vibration control process that can be executed in Step S135 of FIG. 4 in which three units are involved in a case in which the camera body serves as the host. The camera body 110, the lens adapter 130, and the lens unit 140a are involved in the anti-vibration control process illustrated in FIG. 10. Note that, while a larger number of hops in inter-unit communication are necessary than in the example of FIG. 8 in the example of FIG. 10, the example can be employed as an advantageous process in a case in which, for example, suppression of blur caused by rotation around the optical axis is prioritized.

Referring to FIG. 10, first, the vibration sensor 142a of the lens unit 140a measures vibration of the lens unit 140a in Step S511. The position sensor 143a of the lens unit 140a measures the current position of the anti-vibration lens 141a in Step S512. The lens controller 144a transmits sensor data in which the measurement results acquired from the sensors are described to the lens adapter 130 in Step S513.

The vibration sensor 132 of the lens adapter 130 measures vibration of the lens adapter 130 in Step S514. The position sensor 133 of the lens adapter 130 measures the current position of the anti-vibration lens 131 in Step S515. The adapter controller 134 transmits the sensor data in which the measurement results acquired from the sensors are described to the camera body 110 and transfers the sensor data received from the lens unit 140a to the camera body 110 in Step S516b.

The vibration sensor 122 (and the acceleration sensor 121) of the camera body 110 measures vibration (and an acceleration) of the camera body 110 in Step S517. The position sensor 123 of the camera body 110 measures the current position of the image sensor 111 in Step S518. The camera controller 124 acquires the measurement results from the sensors and receives the sensor data from the lens adapter 130 and the lens unit 140a in Step S519.

The camera controller 124 executes a coordinative arithmetic process for anti-vibration operations in Step S520 on the basis of the sensor data collected in Step S519, and divides a total control quantity for eliminating vibration of the camera system 10 as a whole into control quantities for the plurality of anti-vibration functions. Then, the camera controller 124 transmits control data in which the control quantity for the anti-vibration function of the lens adapter 130 is described and control data in which the control quantity for the anti-vibration function of the lens unit 140a is described to the lens adapter 130 in Step S581.

The adapter controller 134 of the lens adapter 130 receives the control data from the camera body 110 serving as the host and transfers the control data of the lens unit 140a to the lens unit 140a in Step S582b. Then, the adapter controller 134 drives the anti-vibration lens 131 in accordance with the control data for the lens adapter 130 in Step S585.

The lens controller 144a of the lens unit 140a receives the control data generated by the camera body 110 serving as the host via the lens adapter 130 in Step S583 and drives the anti-vibration lens 141a in accordance with the received control data in Step S586.

The camera controller 124 of the camera body 110 drives the image sensor 111 in accordance with the control quantity divided by itself to the camera body 110 in Step S584.

(9) Coordinative Arithmetic Process—First Example

Figure 11:
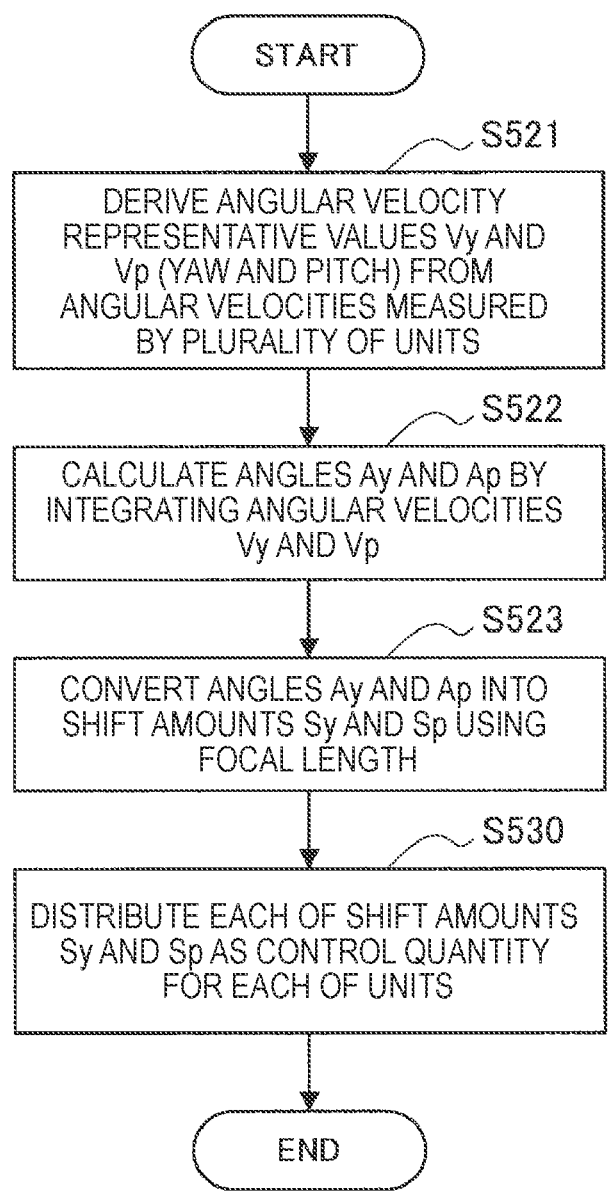
FIG. 11 is a flowchart illustrating a first example of a flow of a coordinative arithmetic process.

FIG. 11 is a flowchart illustrating a first example of a flow of a coordinative arithmetic process that can be executed in Step S520 in FIG. 8 or FIG. 10 or Step S520b in FIG. 9. In the first example, only an angular velocity in the yaw direction and an angular velocity in the pitch direction are included in the coordinative arithmetic process as sensor outputs. Note that, the adapter controller 134 of the lens adapter 130 is assumed to execute the coordinative arithmetic process here for the sake of convenience in description. In the case in which the camera body 110 serves as the host, the adapter controller 134 may be read as the camera controller 124 in the following description.

Referring to FIG. 11, the adapter controller 134 derives angular velocity representative values $V_y$ and $V_p$ from angular velocities measured by the plurality of units in Step S521. Here, $V_y$ represents (the representative value of) the angular velocity in the yaw direction, and $V_p$ represents (the representative value of) the angular velocity in the pitch direction. A representative value may be, for example, the average of values measured by two or more units among the lens unit, the lens adapter, and the camera body, or one (e.g., the median) selected from the measured values.

Next, the adapter controller 134 calculates an angle $A_y$ in the yaw direction by integrating the angular velocity $V_y$ and calculates an angle $A_p$ in the pitch direction by integrating the angular velocity $V_p$ in Step S522.

Next, the adapter controller 134 converts the angle $A_y$ and the angle $A_p$ into a shift amount $S_y$ and a shift amount $S_p$ respectively using a focal length L in Step S523. The conversion performed here can be expressed using, for example, the following formulas (1) and (2).

[Math. 1]

$$S_y = L \cdot \tan(A_y) \quad (1)$$

$$S_p = L \cdot \tan(A_p) \quad (2)$$

Next, the adapter controller 134 distributes each of the shift amount $S_y$ and the shift amount $S_p$ as a control quantity for each of the units in Step S530. Two examples of a technique for distribution of control quantities used here will be further described using FIGS. 12 and 13.

(10) Distribution of Control Quantities

Figure 12:
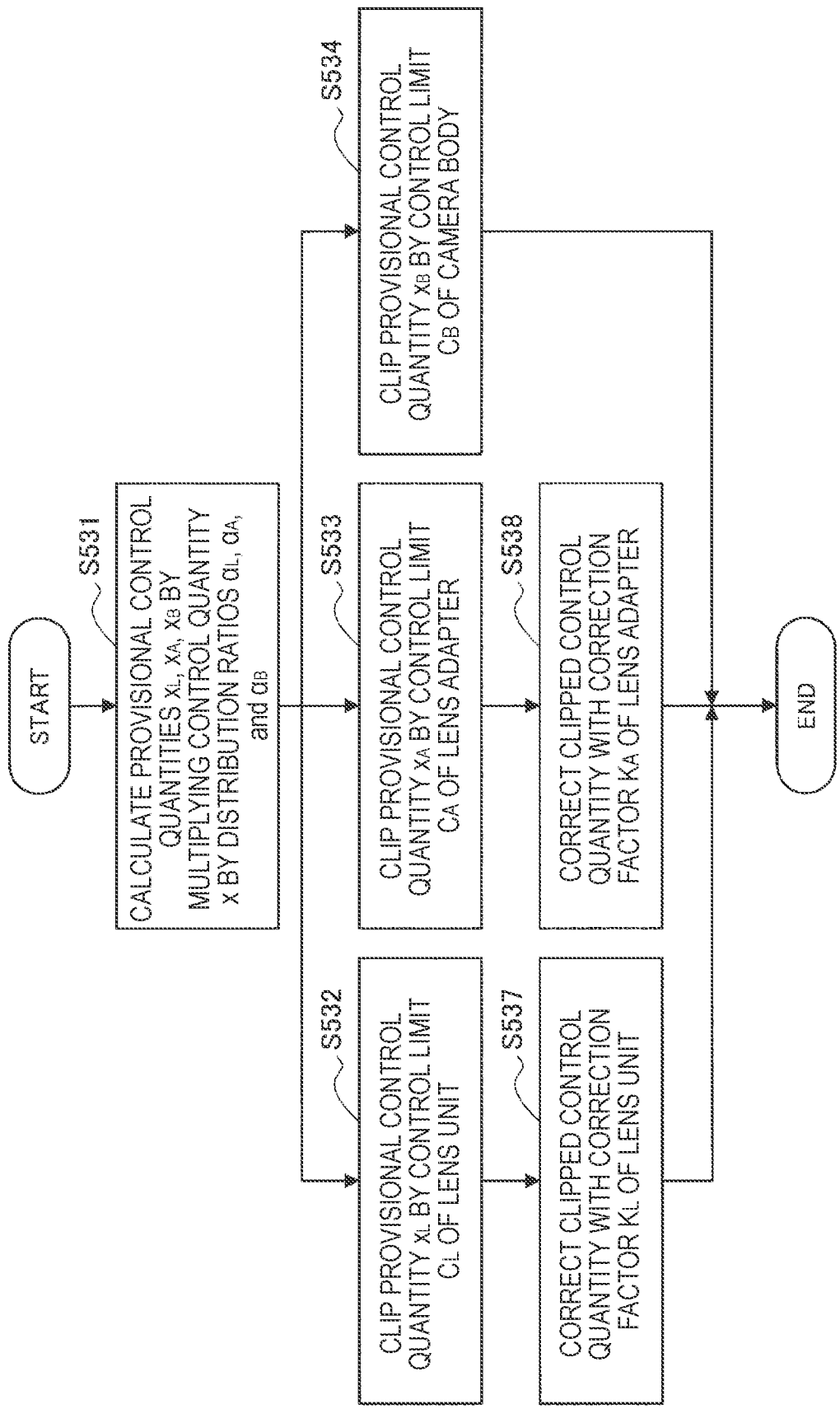
FIG. 12 is a flowchart illustrating a first example of a technique of distributing control quantities in a yaw direction and a pitch direction to three units.
Figure 13:
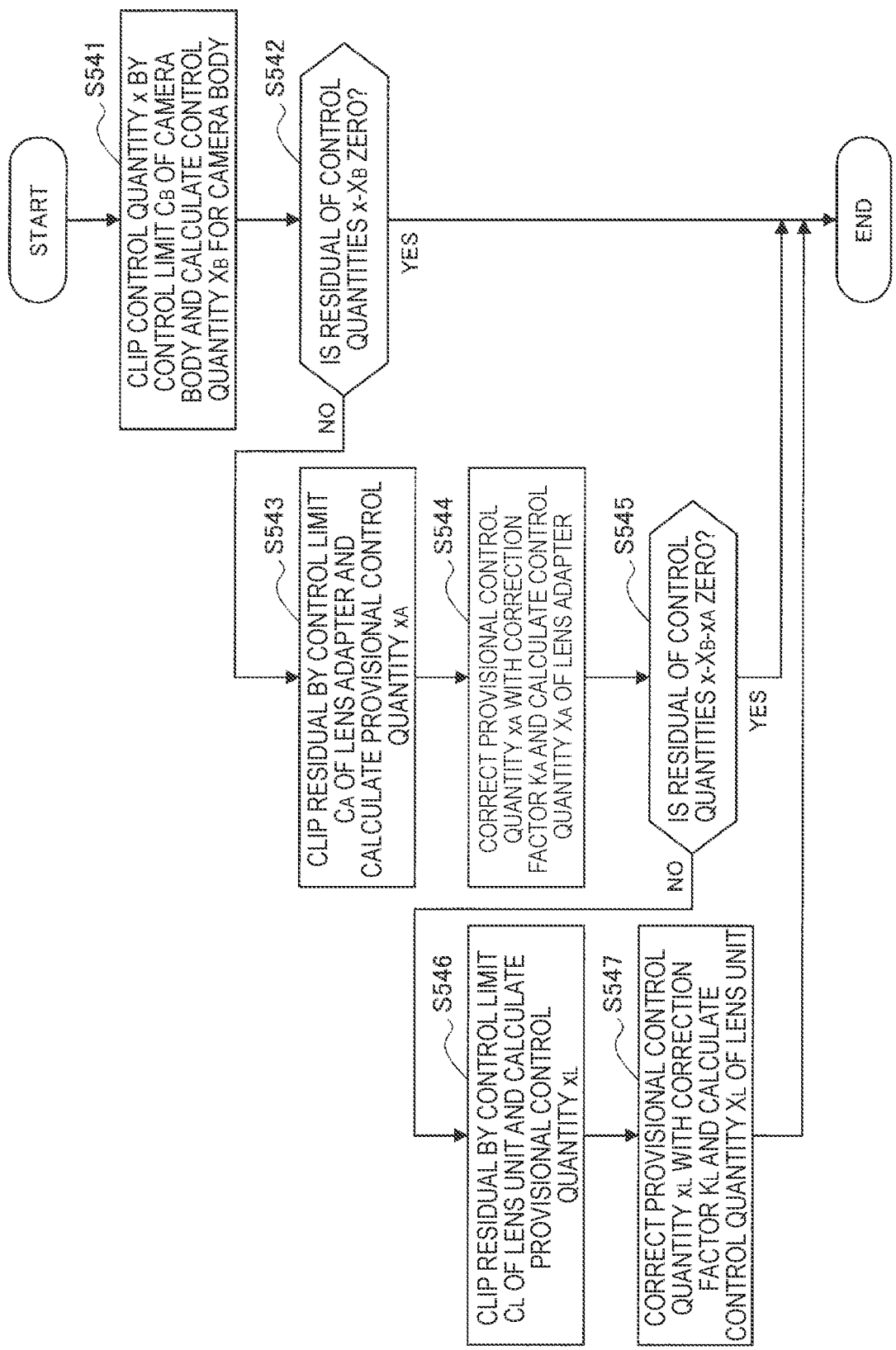
FIG. 13 is a flowchart illustrating a second example of a technique of distributing control quantities in a yaw direction and a pitch direction to three units.

FIGS. 12 and 13 each illustrate first and second examples of the technique for distributing control quantities in the yaw direction and the pitch direction to the three units.

In the first technique illustrated in FIG. 12, first, provisional control quantities $x_L$, $x_A$, and $x_B$ are calculated by multiplying a pre-distribution control quantity x by predetermined distribution ratios $\alpha_L$, $\alpha_A$, and $\alpha_B$ using the following formulas (3) to (5) in Step S531. The pre-distribution control quantity x can correspond to the shift amount $S_y$ or the shift amount $S_p$ calculated in Step S523. Note that, $\alpha_L$ denotes a distribution ratio for the lens unit, $\alpha_A$ denotes a distribution ratio for the lens adapter, and $\alpha_B$ denotes a distribution ratio for the camera body. In a case of equal distribution, for example, $\alpha_L = \alpha_A = \alpha_B = 1/3$ may be set. $x_L$ denotes a provisional control quantity for the lens unit, $x_A$ denotes a provisional control quantity for the lens adapter, and $x_B$ denotes a provisional control quantity for the camera body.

[Math. 2]

$$x_L = \alpha_L \cdot x \quad (3)$$

$$x_A = \alpha_A \cdot x \quad (4)$$

$$x_B = \alpha_B \cdot x \quad (5)$$

Next, the provisional control quantity $x_L$ for the lens unit is clipped by a control limit $C_L$ in Step S532. Likewise, the provisional control quantity $x_A$ for the lens adapter is clipped by a control limit $C_A$ in Step S533, and the provisional control quantity $x_B$ for the camera body is clipped by a control limit $C_B$ in Step S534. The clipping can be expressed using, for example, the following formulas (6) to (8). Note that, $X_L$, $X_A$, and $X_B$ each denote clipped control quantities for the lens unit, the lens adapter, and the camera body.

[Math. 3]

$$X_L = \begin{cases} x_L & (x_L < C_L) \\ C_L & (x_L \geq C_L) \end{cases} \quad (6)$$

$$X_A = \begin{cases} x_A & (x_A < C_A) \\ C_A & (x_A \geq C_A) \end{cases} \quad (7)$$

$$X_B = \begin{cases} x_B & (x_B < C_B) \\ C_B & (x_B \geq C_B) \end{cases} \quad (8)$$

The control quantities so far are expressed with scales on the imaging plane of the image sensor. In Step S537, in order to convert the scale of the imaging plane into a control scale of the anti-vibration lens of the lens unit, the control quantity $X_L$ for the lens unit can be corrected with a predetermined correction factor $K_L$ (e.g., the control quantity $X_L$ is divided by the correction factor $K_L$). Likewise, in Step S538, in order to convert the scale of the imaging plane into a control scale of the anti-vibration lens of the lens adapter, control quantity $X_A$ for the lens adapter can be corrected with a predetermined correction factor $K_A$ (e.g., the control quantity $X_A$ is divided by the correction factor $K_A$). Note that, the order of clipping and scale conversion may be reversed. Although the control limits $C_L$, $C_A$, and $C_B$ of the formulas (6) to (8) are expressed with scales on the imaging plane, in a case in which clipping is performed after scale conversion, values of control limits expressed with control scales of the anti-vibration lenses can be used.

By performing such distribution with respect to the shift amount $S_y$ that is a total control quantity in the yaw direction, a shift amount of the lens unit in the yaw direction, a shift amount of the lens adapter in the yaw direction, and a shift amount of the camera body in the yaw direction can be calculated. Likewise, by performing such distribution with respect to the shift amount $S_p$ that is a total control quantity in the pitch direction, a shift amount of the lens unit in the pitch direction, a shift amount of the lens adapter in the pitch direction, and a shift amount of the camera body in the pitch direction can be calculated.

In the second technique illustrated in FIG. 13, first, a pre-distribution control quantity x is clipped by the control limit $C_B$ of the camera body, and the control quantity $X_B$ for the camera body is calculated using the following formula in Step S541.

[Math. 4]

$$X_B = \begin{cases} x & (x < C_B) \\ C_B & (x \geq C_B) \end{cases} \quad (9)$$

Next, the residual of the control quantities $x-X_B$ is calculated in Step S542, and in a case in which the residual $x-X_B$ is not zero, further distribution is performed. In Step S543, the residual $x-X_B$ is clipped by the control limit $C_A$ of the lens adapter, and the provisional control quantity $x_A$ for the lens adapter is calculated using the following formula.

[Math. 5]

$$x_A = \begin{cases} x - X_B & (x - X_B < C_A) \\ C_A & (x - X_B \geq C_A) \end{cases} \quad (10)$$

The provisional control quantity $x_A$ for the lens adapter can be corrected with the predetermined correction factor $K_A$ in order to convert the scale on the imaging plane into the control scale of the anti-vibration lens of the lens adapter in Step S544. As a result, the control quantity $X_A$ for the lens adapter is calculated.

Next, the residual of the control quantities on the imaging plane $x-X_B-x_A$ is calculated in Step S545, and in a case in which the residual is not zero, further distribution is performed. In Step S546, the residual is clipped by the control limit $C_L$ of the lens unit, and the provisional control quantity $x_L$ for the lens unit is calculated using the following formula.

[Math. 6]

$$x_L = \begin{cases} x - X_B - x_A & (x - X_B - x_A < C_L) \\ C_L & (x - X_B - x_A \geq C_L) \end{cases} \quad (11)$$

The provisional control quantity $x_L$ for the lens unit can be corrected with the predetermined correction factor $K_L$ in order to convert the scale on the imaging plane into the control scale of the anti-vibration lens of the lens unit in Step S547. As a result, the control quantity $X_L$ for the lens unit is calculated.

In the example of FIG. 13, the pre-distribution control quantity x that is the total control quantity (e.g., which corresponds to the shift amount $S_y$ or $S_p$) is clipped by the control limit $C_B$ of the camera body at first. This means that, as long as the total control quantity does not exceed the control limit of the camera body, a control quantity is distributed only to the camera body, that is, an anti-vibration operation of the camera body is preferentially used. This distribution technique is particularly suitable for the case in which the camera body serves as the host to an anti-vibration operation. The reason for this is that, in the case in which a control quantity is distributed only to the camera body, the necessity for transmission of the control data to the lens adapter and the lens unit is avoided and a control delay is reduced. On the other hand, in the case in which the lens adapter serves as the host to an anti-vibration operation, the total control quantity is clipped with the control limit of the lens adapter at first, and distributing a control quantity preferentially to the lens adapter is advantageous. The reason for this is that, in the case in which the lens adapter serves as the host and a control quantity is distributed only to the lens adapter, the necessity for transmission of the control data to the camera body and the lens unit is avoided and a control delay is reduced. Different techniques for distributing control quantities may be used depending on which unit serves as the host, as described above.

(11) Coordinative Arithmetic Process—Second Example

Figure 14:
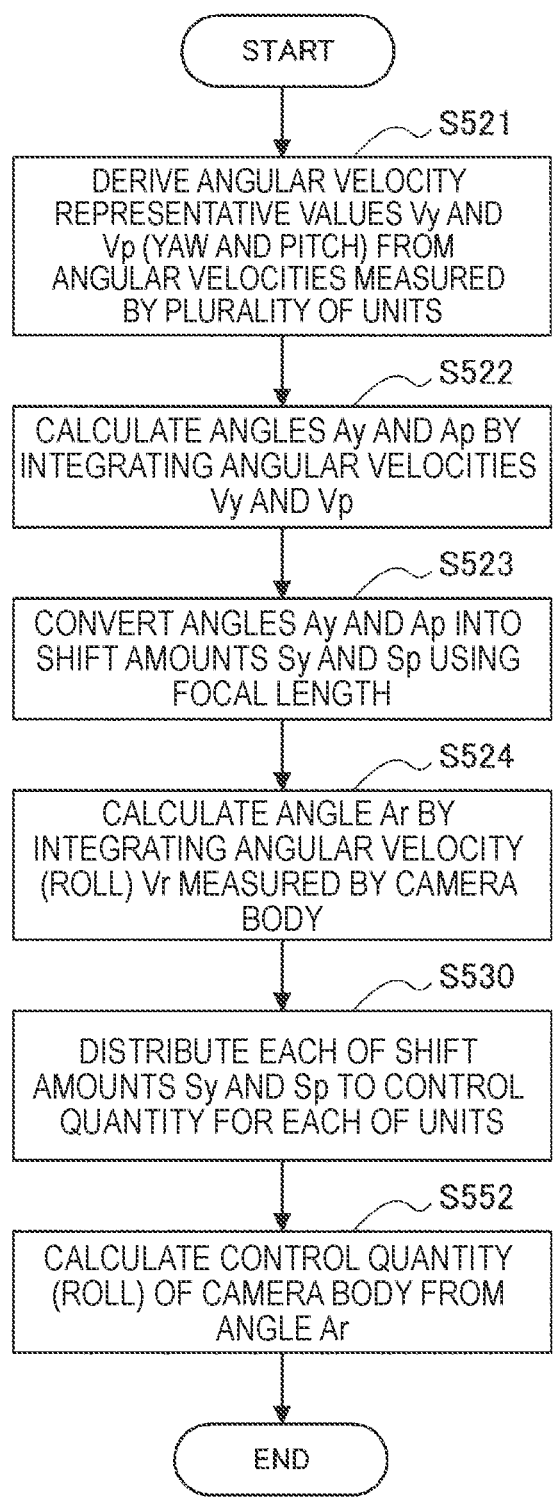
FIG. 14 is a flowchart illustrating a second example of a flow of the coordinative arithmetic process.

FIG. 14 is a flowchart illustrating a second example of a flow of the coordinative arithmetic process that can be executed in Step S520 of FIG. 8 or FIG. 10, or Step S520b of FIG. 9. In the second example, an angular velocity in the roll direction is included in the coordinative arithmetic process as a sensor output, in addition to an angular velocity in the yaw direction and an angular velocity in the pitch direction. Note that, in the case in which the camera body 110 serves as the host, the adapter controller 134 may be read as the camera controller 124 in the following description as well.

Referring to FIG. 14, the adapter controller 134 derives angular velocity representative values $V_y$ and $Y_p$ from angular velocities measured by the plurality of units in Step S521.

Next, the adapter controller 134 calculates an angle $A_y$ in the yaw direction by integrating the angular velocity $V_y$ and calculates an angle $A_p$ in the pitch direction by integrating the angular velocity $V_p$ in Step S522.

Next, the adapter controller 134 converts an angle $A_y$ and an angle $A_p$ into a shift amounts $S_y$ and a shift amount $S_p$ respectively using a focal length L using the above-described formulas (1) and (2) in Step S523.

In addition, the adapter controller 134 calculates an angle $A_r$ in the roll direction by integrating an angular velocity $V_r$ in the roll direction measured by the camera body in Step S524.

Next, the adapter controller 134 distributes each of the shift amount $S_y$ and the shift amount $S_p$ to a control quantity for each of the units using, for example, the technique described in FIG. 12 or FIG. 13 in Step S530.

In addition, the adapter controller 134 calculates a rotation amount of the image sensor 111 in the roll direction as one control quantity for the camera body 110 from the angle $A_r$ (typically, the rotation amount may be equal to the angle $A_r$) in Step S552.

(12) Coordinative Arithmetic Process—Third Example

Figure 15:
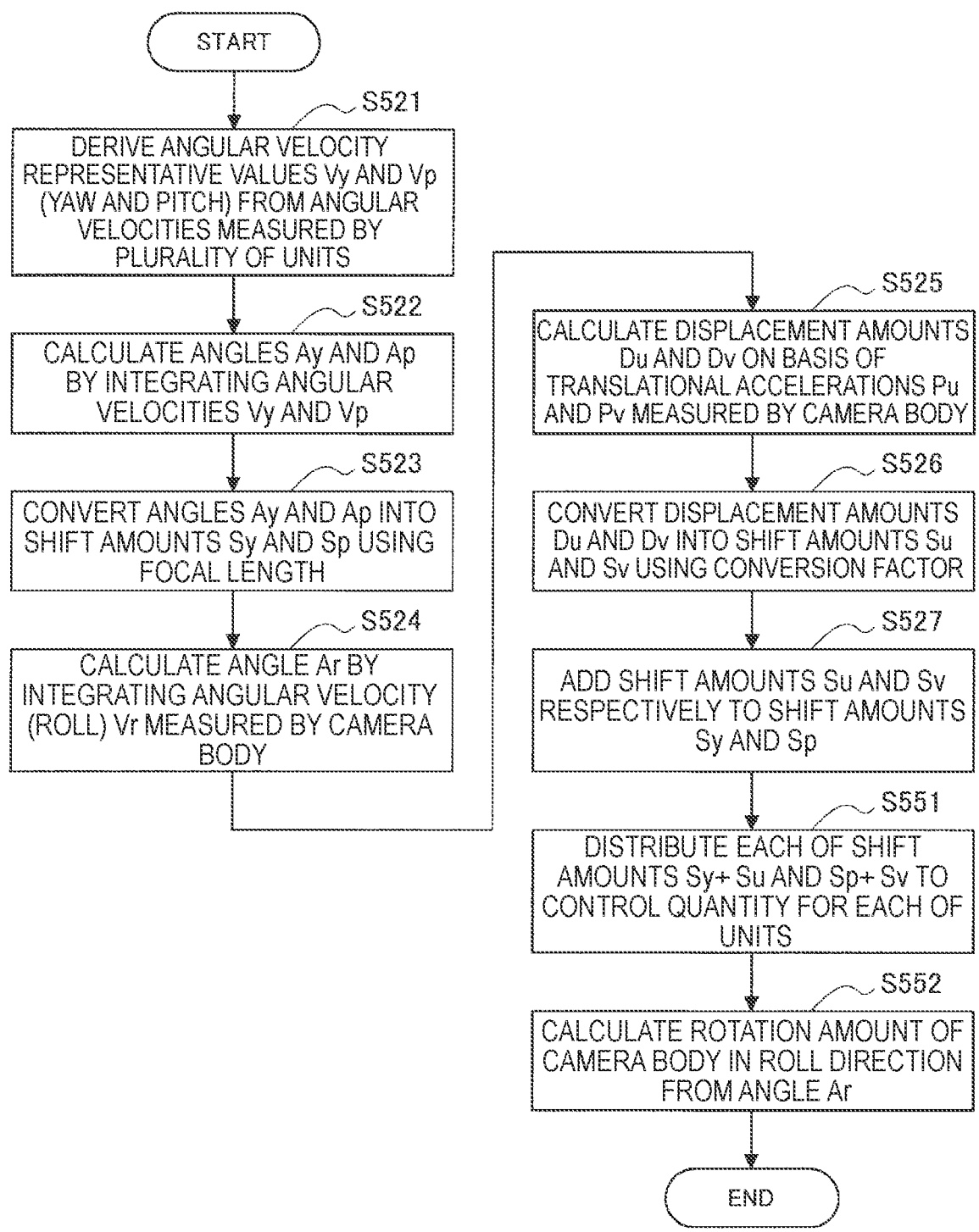
FIG. 15 is a flowchart illustrating a third example of a flow of the coordinative arithmetic process.

FIG. 15 is a flowchart illustrating a third example of a flow of the coordinative arithmetic process that can be executed in Step S520 of FIG. 8 or FIG. 10, or Step S520b of FIG. 9. In the third example, an acceleration measured by the acceleration sensor may be included in the coordinative arithmetic process as a sensor output, in addition to angular velocities. Note that, in the case in which the camera body 110 serves as the host, the adapter controller 134 may be read as the camera controller 124 in the following description as well.

Referring to FIG. 15, the adapter controller 134 derives angular velocity representative values $V_y$ and $Y_p$ from angular velocities measured by the plurality of units in Step S521.

Next, the adapter controller 134 calculates an angle $A_y$ in the yaw direction by integrating the angular velocity $V_y$ and calculates an angle $A_p$ in the pitch direction by integrating the angular velocity $V_p$ in Step S522.

Next, the adapter controller 134 converts an angle $A_y$ and an angle $A_p$ into a shift amounts $S_y$ and a shift amount $S_p$ respectively using a focal length L using the above-described formulas (1) and (2) in Step S523.

In addition, the adapter controller 134 calculates an angle $A_r$ in the roll direction by integrating an angular velocity $V_r$ in the roll direction measured by the camera body in Step S524.

In addition, the adapter controller 134 calculates a displacement amount $D_u$ in the horizontal direction by double-integrating a transitional acceleration $P_u$ in the horizontal direction measured by the camera body and calculates a displacement amount $D_v$ in the vertical direction by double-integrating a transitional acceleration $P_v$ in the vertical direction in Step S525.

Next, the adapter controller 134 calculates a shift amount $S_u$ in the horizontal direction and a shift amount $S_v$ in the vertical direction respectively by multiplying the displacement amount $D_u$ and the displacement amount $D_v$ by a predetermined conversion factor in Step S526 in order to convert the scale of the acceleration sensor into the scale on the imaging plane.

Next, the adapter controller 134 adds the shift amount $S_u$ in the horizontal direction to the shift amount $S_y$ in the yaw direction and adds the shift amount $S_v$ in the vertical direction to the shift amount $S_p$ in the pitch direction in Step S527.

Next, the adapter controller 134 distributes each of the shift amount $S_y+S_u$ and the shift amount $S_p+S_v$ to a control quantity for each of the units using, for example, the technique described in FIG. 12 or FIG. 13 in Step S551.

In addition, the adapter controller 134 calculates a rotation amount of the image sensor 111 in the roll direction as one control quantity for the camera body 110 from the angle $A_r$ in Step S552.

The coordinative arithmetic processes described using FIGS. 11 to 15 can be executed by the adapter controller 134 of the lens adapter 130 in Step S520 of FIG. 8, and by the camera controller 124 of the camera body 110 in Step S520 of FIG. 10. The similar coordinative arithmetic process can be executed by the camera controller 124 of the camera body 110 in Step S520b of FIG. 9. However, since the lens unit 140b is not involved in the anti-vibration operation in the scenario of FIG. 9, distribution of the control quantity to the lens unit can be omitted.

3. SECOND EMBODIMENT

The example in which the camera body 110 has the mechanism for driving the image sensor for anti-vibration has been described in the previous section. In the present section, an example in which a camera body does not have a mechanism for driving an image sensor while executing a host determination process for anti-vibration will be described as a second embodiment.

3-1. Detailed Configuration of Each Unit

Figure 17A:
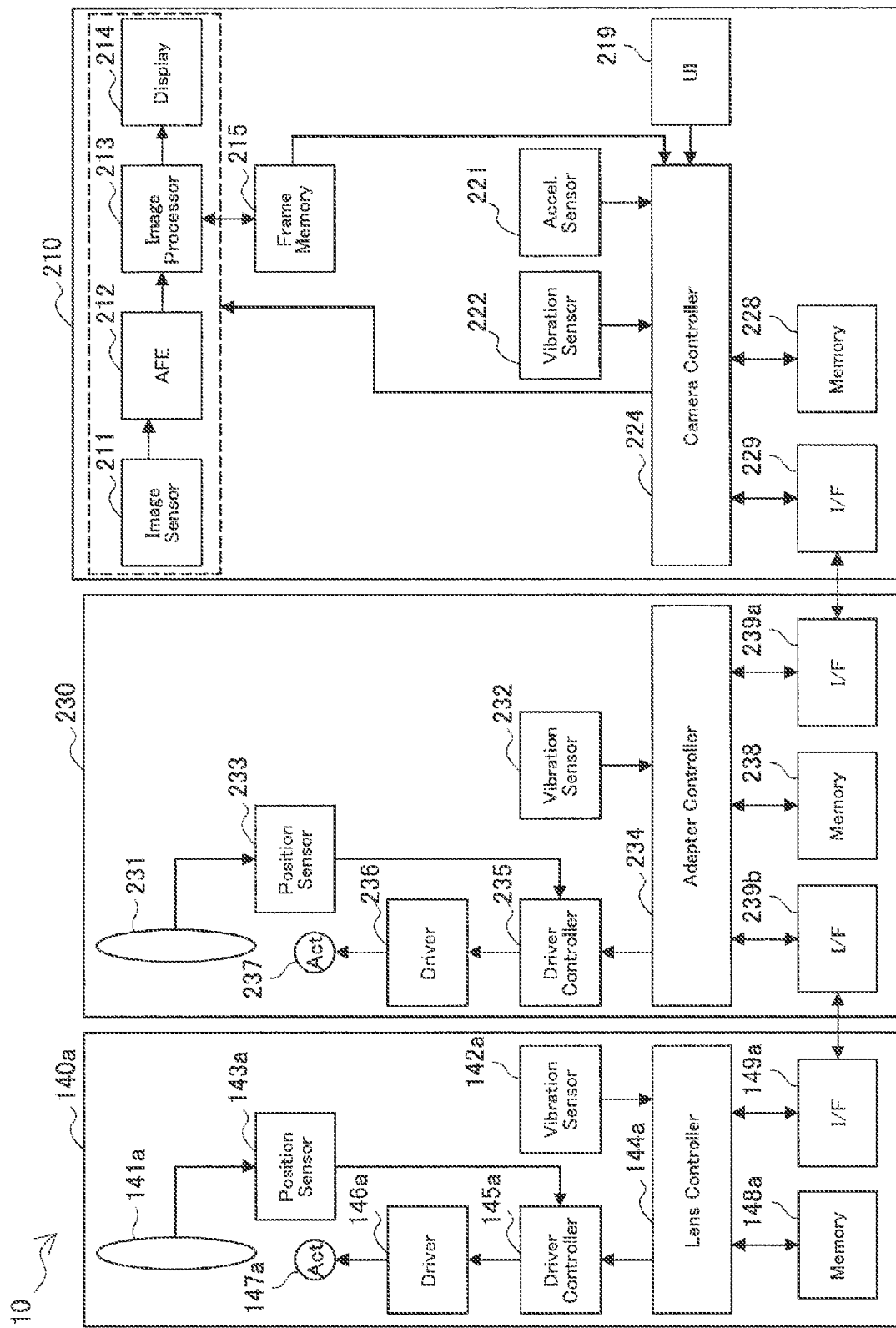
FIG. 17A is a block diagram illustrating an example of a detailed configuration of a camera system according to a second embodiment in which a lens unit with an anti-vibration function is mounted.

FIG. 17A is a block diagram illustrating an example of a detailed configuration of a camera system 10 according to a second embodiment in which a lens unit with an anti-vibration function is mounted. FIG. 17B is a block diagram illustrating an example of a detailed configuration of the camera system 10 according to the second embodiment in which a lens unit with no anti-vibration function is mounted.

Referring to FIG. 17A, the camera system 10 includes a camera body 210 and a lens adapter 230. The camera body 210 has a sensor for an anti-vibration function of suppressing blur in a captured image. The lens adapter 230 has the anti-vibration function. Furthermore, a lens unit 140a is mounted on the camera body 210 via the lens adapter 230. The lens unit 140a also has an anti-vibration function of suppressing blur in a captured image.

The camera body 210 has an image sensor 211, an AFE 212, an image processor 213, a display 214, a frame memory 215, a UI 219, an acceleration sensor 221, a vibration sensor 222, a camera controller 224, a memory 228, and an interface 229. The image sensor 211 converts a signal of light incident along an optical axis of the camera system 10 into an electrical signal. The AFE 212 performs processing of the analog domain on an analog image signal that is an electrical signal input from the image sensor 211 and converts the processed analog image signal into a digital image signal. The image processor 213 performs processing of the digital domain on a digital image signal input from the AFE, 212. The image processor 213 may superimpose an OSD for displaying information regarding a system setting or a user input on an image displayed by the display 214. The digital image signal processed by the image processor 213 is output to at least one of the display 214 or the frame memory 215. The display 214 displays an image on a screen on the basis of the digital image signal input from the image processor 213. The frame memory 215 stores the digital image signal input from the image processor 213 as image data. The UI 219 may include any type of input interface for receiving user inputs. The acceleration sensor 221 measures an acceleration applied to the camera body 210. The vibration sensor 222 measures an angular velocity of the camera body 210.

The camera controller 224 is a processing device that controls overall operations such as imaging by the camera body 210 and displaying and recording of images. In addition, in a case in which a lens unit or a lens adapter mounted or connected to the camera body 210 has the anti-vibration function, the camera controller 224 can also perform coordinative control on anti-vibration operations performed in the entire camera system 10. In the present embodiment, the camera controller 224 executes the host determination process described using FIG. 6, FIG. 7A, or FIG. 7B and thereby determines the host to anti-vibration operations. The memory 228 is a storage medium that stores programs and data for control of the camera controller 224. The interface 229 provides communication connection of the camera body 210 and the lens adapter or the lens unit.

The lens adapter 230 has an anti-vibration lens 231, a vibration sensor 232, a position sensor 233, an adapter controller 234, a driver controller 235, a driver 236, an actuator 237, a memory 238, a body-side interface 239a, and the lens-side interface 239b. The anti-vibration lens 231 changes a path of light passing through the optical system of the camera system 10 in accordance with its own position. The vibration sensor 232 measures angular velocities of the lens adapter 230. The position sensor 233 measures a position of the anti-vibration lens 231.

The adapter controller 234 is a processing device that controls anti-vibration operations of the lens adapter 230 and thereby suppresses blur in captured images. In a case in which the lens unit or the camera body connected to the lens adapter 230 has an anti-vibration function, the adapter controller 234 can also perform coordinative control of anti-vibration operations performed in the entire camera system 10. In the present embodiment, in a case in which the camera controller 224 of the camera body 210 determines the lens adapter 230 as the host to anti-vibration operations, the adapter controller 234 performs coordinative arithmetic operations for anti-vibration. The driver controller 235 determines a drive amount of the anti-vibration lens 231 on the basis of control target values instructed by the adapter controller 234 and a current position input from the position sensor 233. The driver 236 outputs a drive signal indicating the drive amount determined by the driver controller 235 to the actuator 237. The actuator 237 shifts the position of the anti-vibration lens 231 in accordance with the drive signal input from the driver 236. The memory 238 is a storage medium that stores programs and data for control of the adapter controller 234. The body-side interface 239a provides communication connection between the lens adapter 230 and the camera body 210. The lens-side interface 239b provides communication connection between the lens adapter 230 and the lens unit.

Referring to FIG. 17B, the camera system 10 includes the camera body 210 and the lens adapter 230, similarly to the example of FIG. 17A. Furthermore, the lens unit 140b is mounted on the camera body 210 via the lens adapter 230. The lens unit 140b does not have the anti-vibration function.

3-2. Host Determination Condition

Also, in the present embodiment, the camera controller 224 that is the processing device of the camera body 210 determines a mounting state of the lens adapter and the lens unit and determines the host to anti-vibration operations on the basis of the determination result, as in the first embodiment as described above. A specific host determination condition may be on the basis of whether or not a lens unit to be mounted via the lens adapter 230 has the anti-vibration function, as in the example shown in Table 1. Additionally or alternatively, host determination conditions may include a condition relating to communication performance, as in the examples shown in Table 2 to Table 4. For example, in a case in which the lens unit has the anti-vibration function, when it is determined that communication performance between the lens adapter 230 and the camera body 210 does not satisfy a predetermined condition, the host that should primarily perform an arithmetic operation for anti-vibration may be automatically determined on the basis of a user input or an imaging mode. The host determination process may be triggered by any event such as input of power to the camera body 210, detection of replacement of the lens unit, or the like.

3-3. Flow of Process

An overall flow of a process executed by the camera controller 224 of the camera body 210 may be similar to the flow described using FIG. 4. In addition, an overall process of a process executed by an adapter controller 234 of the lens adapter 230 may be similar to the flow described using FIG. 5.

(1) Anti-Vibration Control Process by Lens Adapter (for Three Units)

FIG. 18 is a sequence diagram illustrating an example of the flow of the anti-vibration control process that can be executed in the present embodiment in which the three units are involved in a case in which the lens adapter serves as the host. The camera body 210, the lens adapter 230, and the lens unit 140a are involved in the anti-vibration control process illustrated in FIG. 18.

Referring to FIG. 18, first, the vibration sensor 142a of the lens unit 140a measures vibration of the lens unit 140a in Step S501. The position sensor 143a of the lens unit 140a measures the current position of the anti-vibration lens 141a in Step S502. The lens controller 144a transmits sensor data in which the measurement results acquired from the sensors are described to the lens adapter 230 in Step S503.

The vibration sensor 222 (and the acceleration sensor 221) of the camera body 210 measures vibration (and an acceleration) of the camera body 210 in Step S504. The camera controller 224 transmits sensor data in which the measurement results acquired from the sensors are described to the lens adapter 230 in Step S506.

The vibration sensor 232 of the lens adapter 230 measures vibration of the lens adapter 230 in Step S507. The position sensor 233 of the lens adapter 230 measures the current position of the anti-vibration lens 231 in Step S508. The adapter controller 234 acquires the measurement results from the sensors and receives the sensor data from the lens unit 140a and the sensor data from the camera body 210 in Step S509.

The adapter controller 234 executes a coordinative arithmetic process for anti-vibration operations in Step S520 on the basis of the sensor data collected in Step S509, and divides a total control quantity for eliminating vibration of the camera system 10 as a whole into control quantities for the plurality of anti-vibration functions. Then, the adapter controller 234 transmits control data in which the control quantity for the anti-vibration function of the lens unit 140a is described to the lens unit 140a in Step S571.

The lens controller 144a of the lens unit 140a receives the control data from the lens adapter 230 serving as the host in Step S572, and drives the anti-vibration lens 141a in accordance with the received control data in Step S575.

The adapter controller 234 of the lens adapter 230 drives the anti-vibration lens 231 in accordance with the control quantity divided by itself to the lens adapter 230 in Step S574.

(2) Anti-Vibration Control Process by Camera Body (for Two Units)

Figure 19:
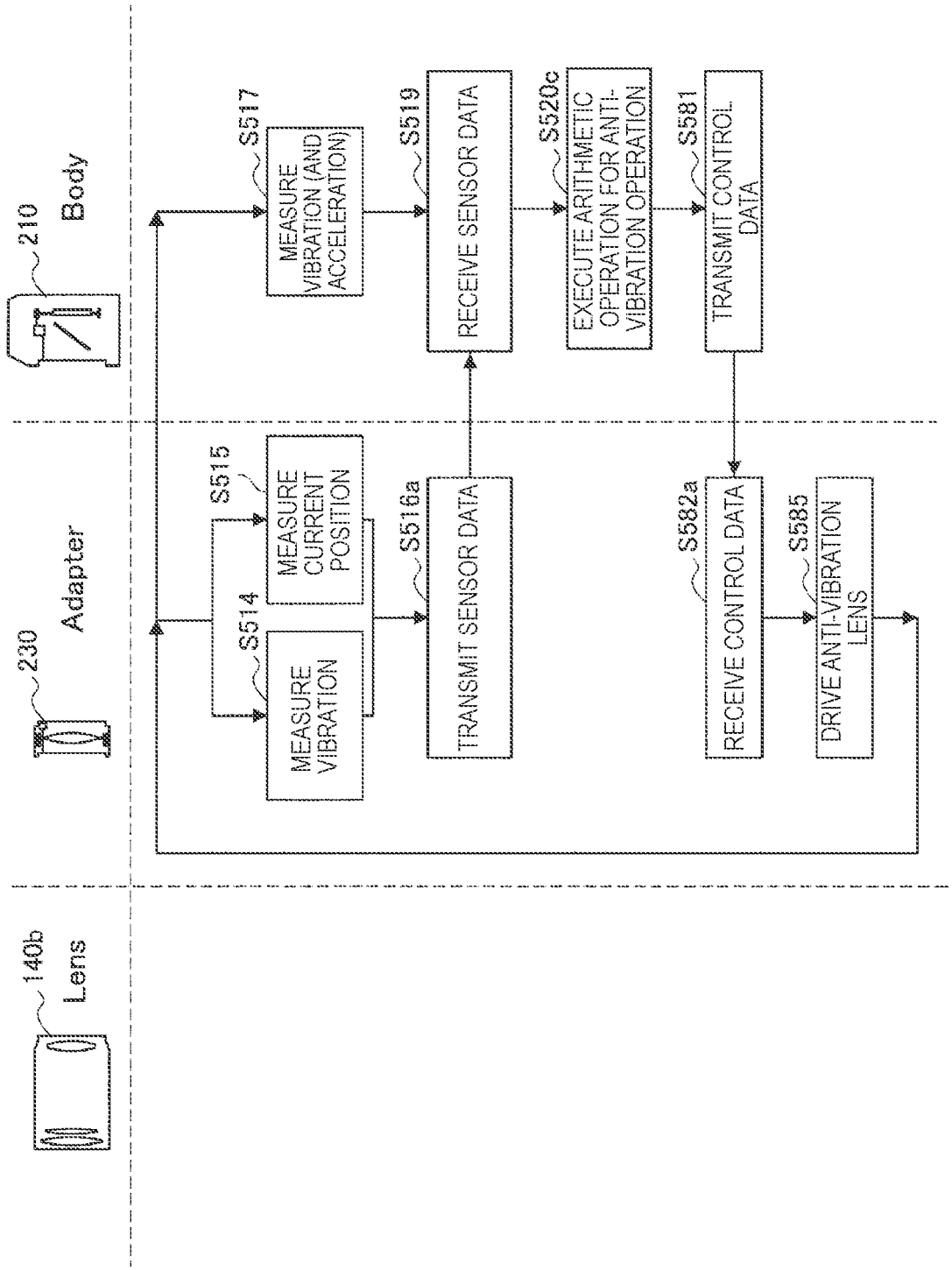
FIG. 19 is a sequence diagram illustrating an example of a flow of an anti-vibration control process in which two units according to the second embodiment are involved in a case in which a camera body serves as a host.

FIG. 19 a sequence diagram illustrating an example of the flow of the anti-vibration control process that can be executed in Step S135 of FIG. 4 in which two units are involved in a case in which the camera body serves as the host. The camera body 210 and the lens adapter 230 are involved in the anti-vibration control process illustrated in FIG. 19.

Referring to FIG. 19, first, the vibration sensor 232 of the lens adapter 230 measures vibration of the lens adapter 230 in Step S514. The position sensor 233 of the lens adapter 230 measures the current position of the anti-vibration lens 231 in Step S515. The adapter controller 234 transmits sensor data in which the measurement results acquired from the sensors are described to the camera body 210 in Step S516a.

The vibration sensor 222 (and the acceleration sensor 221) of the camera body 210 measures vibration (and an acceleration) of the camera body 210 in Step S517. The camera controller 224 acquires the measurement results from the sensors and receives the sensor data from the lens adapter 230 in Step S519.

The camera controller 224 executes an arithmetic operation for an anti-vibration operation in Step S520c on the basis of the sensor data collected in Step S519. Then, the camera controller 224 transmits control data in which a control quantity for the anti-vibration function of the lens adapter 230 is described to the lens adapter 230 in Step S581.

The adapter controller 234 of the lens adapter 230 receives the control data from the camera body 210 serving as the host in Step S582a and drives the anti-vibration lens 231 in accordance with the received control data in Step S585.

(3) Coordinative Arithmetic Process

A coordinative arithmetic process for an anti-vibration operation executed in the present embodiment may be similar to those described using FIGS. 11 to 15. In the present embodiment, however, the camera body 210 has no actuator while having sensors for the anti-vibration function. For this reason, for example, control quantities such as a shift amount in the yaw direction and a shift amount in the pitch direction may not be distributed to the camera body 210. In addition, arithmetic operations for rotation in the roll direction may be omitted. In the scenario of FIG. 19, since the lens unit 140b is not involved in the anti-vibration operation and the camera body 210 does not drive the image sensor 211, the anti-vibration operation may be similar to a normal anti-vibration operation performed in a single unit except that vibration amount representative value can be derived from sensor data collected from the camera body 210 and the lens adapter 230.

4. THIRD EMBODIMENT

In the first and second embodiments, the host determination processes are executed by the camera bodies in accordance with the conditions introduced in Table 1 to Table 4. However, the technology of the present disclosure can be applied also to an example in which the host determination process is executed by a lens adapter or a lens unit, rather than a camera body. In a third embodiment to be described in the present section, the host determination process is executed by a lens adapter.

4-1. Detailed Configuration of Each Unit

Figure 20A:
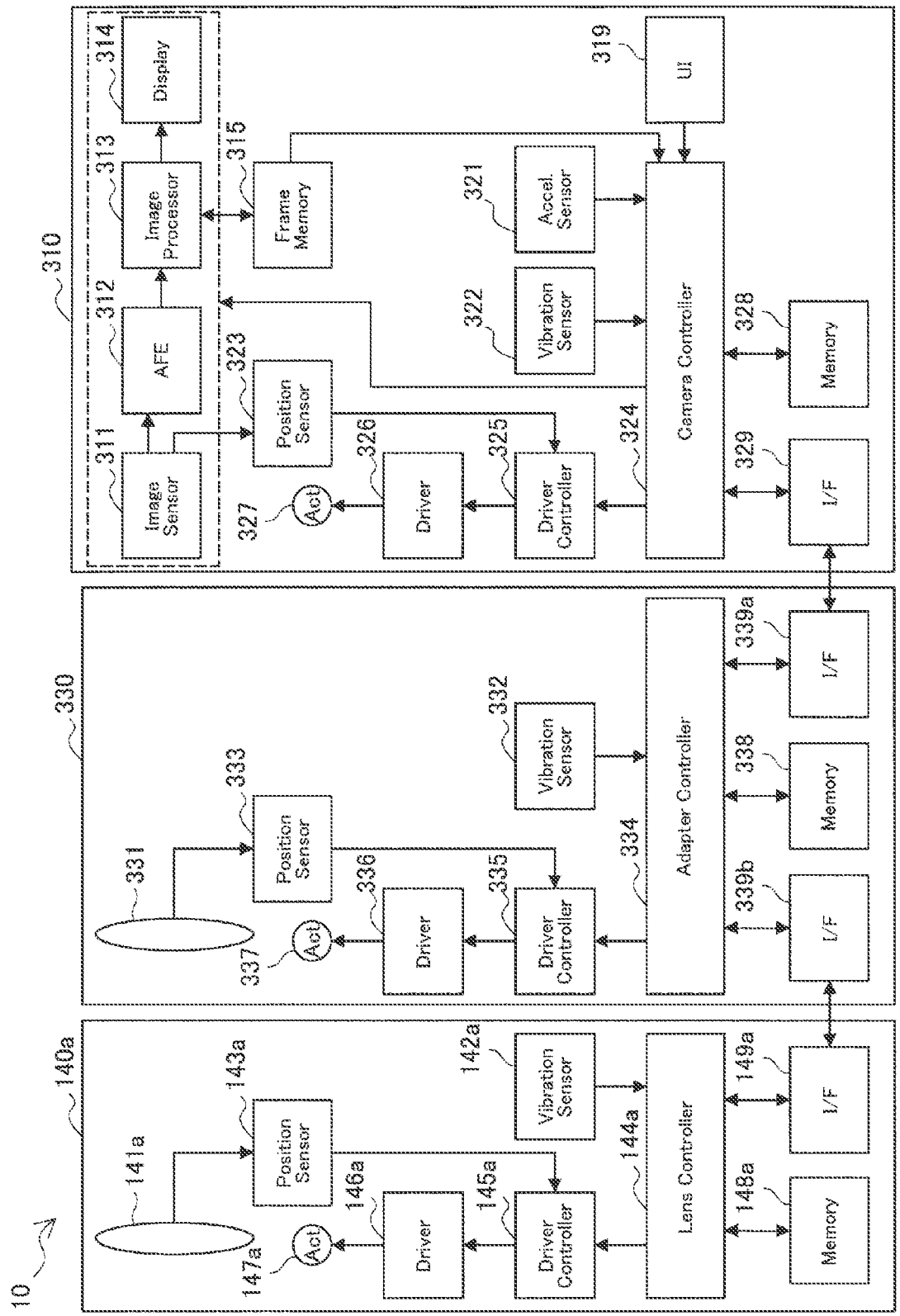
FIG. 20A is a block diagram illustrating an example of a detailed configuration of a camera system according to a third embodiment in which a lens unit with an anti-vibration function is mounted.

FIG. 20A is a block diagram illustrating an example of a detailed configuration of a camera system 10 according to a third embodiment in which a lens unit with an anti-vibration function is mounted. FIG. 20B is a block diagram illustrating an example of a detailed configuration of the camera system 10 according to the third embodiment in which a lens unit with no anti-vibration function is mounted.

Referring to FIG. 20A, the camera system 10 includes a camera body 310 and a lens adapter 330. The camera body 310 has an anti-vibration function of suppressing blur in a captured image. The lens adapter 330 also has the anti-vibration function. Furthermore, a lens unit 140a is mounted on the camera body 310 via the lens adapter 330. The lens unit 140a also has an anti-vibration function of suppressing blur in a captured image.

The camera body 310 has an image sensor 311, an AFE 312, an image processor 313, a display 314, a frame memory 315, a UI 319, an acceleration sensor 321, a vibration sensor 322, a position sensor 323, a camera controller 324, a driver controller 325, a driver 326, an actuator 327, a memory 328, and an interface 329. The image sensor 311 converts a signal of light incident along an optical axis of the camera system 10 into an electrical signal. The AFE, 312 performs processing of the analog domain on an analog image signal that is an electrical signal input from the image sensor 311 and converts the processed analog image signal into a digital image signal. The image processor 313 performs processing of the digital domain on a digital image signal input from the AFE, 312. The image processor 313 may superimpose an OSD for displaying information regarding a system setting or a user input on an image displayed by the display 314. The digital image signal processed by the image processor 313 is output to at least one of the display 314 or the frame memory 315. The display 314 displays an image on a screen on the basis of the digital image signal input from the image processor 313. The frame memory 315 stores the digital image signal input from the image processor 313 as image data. The UI 319 may include any type of input interface for receiving user inputs. The acceleration sensor 321 measures an acceleration applied to the camera body 310. The vibration sensor 322 measures an angular velocity of the camera body 310. The position sensor 323 measures a position of the image sensor 311.

The camera controller 324 is a processing device that controls overall operations such as imaging by the camera body 310 and display and recording of images. In addition, the camera controller 324 controls anti-vibration operations performed by the camera body 310 and thereby suppresses blur in captured images. In a case in which a lens unit or a lens adapter mounted on or connected to the camera body 310 has the anti-vibration function, the camera controller 324 can also perform coordinative control of anti-vibration operations performed in the entire camera system 10. In the present embodiment, the camera controller 324 performs a cooperative arithmetic operation for anti-vibration in a case in which an adapter controller 334 of the lens adapter 330 determines that the camera body 310 is the host to anti-vibration operations. The driver controller 325 determines a drive amount of the image sensor 311 on the basis of a control target value instructed by the camera controller 324 and a current position input from the position sensor 323. The driver 326 outputs a drive signal indicating the drive amount determined by the driver controller 325 to the actuator 327. The actuator 327 shifts the position of the image sensor 311 in accordance with the drive signal input from the driver 326 or rotates the attitude of the image sensor 311. The memory 328 is a storage medium that stores programs and data for control of the camera controller 324. The interface 329 provides communication connection between the camera body 310 and the lens adapter or the lens unit.

The lens adapter 330 has an anti-vibration lens 331, a vibration sensor 332, a position sensor 333, an adapter controller 334, a driver controller 335, a driver 336, an actuator 337, a memory 338, a body-side interface 339a, and the lens-side interface 339b. The anti-vibration lens 331 changes a path of light passing through the optical system of the camera system 10 in accordance with its own position. The vibration sensor 332 measures angular velocities of the lens adapter 330. The position sensor 333 measures a position of the anti-vibration lens 331.

The adapter controller 334 is a processing device that controls anti-vibration operations of the lens adapter 330 and thereby suppresses blur in captured images. In a case in which the lens unit or the camera body connected to the lens adapter 330 has an anti-vibration function, the adapter controller 334 can also perform coordinative control of anti-vibration operations performed in the entire camera system 10. In the present embodiment, the adapter controller 334 determines the host to anti-vibration operations by executing the host determination process described using FIG. 6, FIG. 7A, or FIG. 7B. The driver controller 335 determines a drive amount of the anti-vibration lens 331 on the basis of control target values instructed by the adapter controller 334 and a current position input from the position sensor 333. The driver 336 outputs a drive signal indicating the drive amount determined by the driver controller 335 to the actuator 337. The actuator 337 shifts the position of the anti-vibration lens 331 in accordance with the drive signal input from the driver 336. The memory 338 is a storage medium that stores programs and data for control of the adapter controller 334. The body-side interface 339a provides communication connection between the lens adapter 330 and the camera body 310. The lens-side interface 339b provides communication connection between the lens adapter 330 and the lens unit.

Referring to FIG. 20B, the camera system 10 includes the camera body 310 and the lens adapter 330, similarly to the example of FIG. 20A. Furthermore, the lens unit 140b is mounted on the camera body 310 via the lens adapter 330. The lens unit 140b does not have the anti-vibration function.

4-2. Host Determination Condition

In the present embodiment, the adapter controller 334 that is the processing device of the lens adapter 330 determines a mounting state of the lens unit and determines the host to anti-vibration operations on the basis of the determination result, as described above. A specific host determination condition may be on the basis of whether or not a lens unit to be mounted on the camera body 310 via the lens adapter 330 has the anti-vibration function, as in the example shown in Table 1. Additionally or alternatively, host determination conditions may include a condition relating to communication performance, as in the examples shown in Table 2 to Table 4. For example, in a case in which the lens unit has the anti-vibration function, when it is determined that communication performance between the lens adapter 330 and the camera body 310 does not satisfy a predetermined condition, the host that should primarily perform an arithmetic operation for anti-vibration may be automatically determined on the basis of a user input or an imaging mode. The host determination process may be triggered by any event such as input of power to the camera body 310 and the lens adapter 330, detection of replacement of the lens unit, or the like.

4-3. Flow of Process (1) Process of Camera Body

Figure 21:
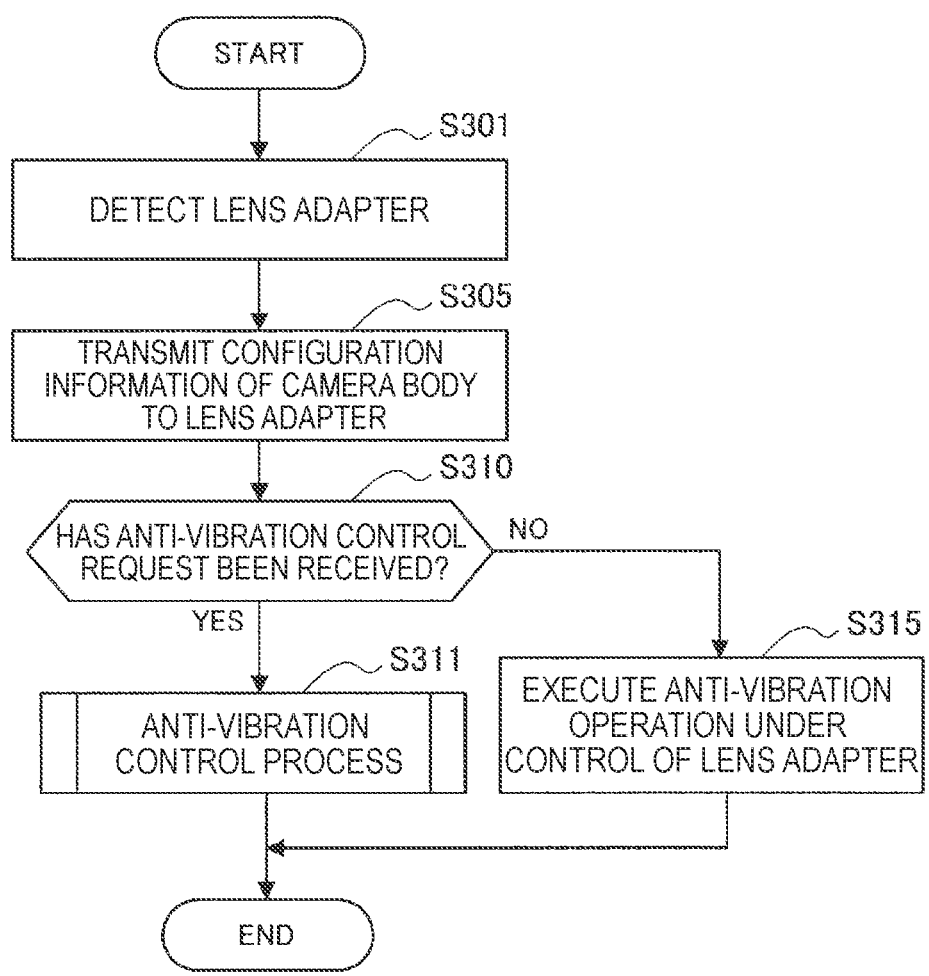
FIG. 21 is a flowchart illustrating an example of an overall flow of a process executed by a processing device of a camera body according to a third embodiment.

FIG. 21 is a flowchart illustrating an example of an overall flow of a process executed by the camera controller 324 of the camera body 310 according to the third embodiment.

Referring to FIG. 21, first, the camera controller 324 detects the lens adapter 330 via the interface 329 in Step S301.

Next, the camera controller 324 transmits configuration information of the camera body 310 to the detected lens adapter 330 in Step S305. The configuration information of the camera body 310 can be stored in the memory 328 in advance. The configuration information of the camera body 310 may include communication speed information indicating a communication speed supported by the camera body 310 or communication protocol information indicating a communication protocol supported by the camera body 310.

Processes performed thereafter branch depending on a result of the host determination process executed by the lens adapter 330. For example, when it is determined to cause the camera body 310 to perform an arithmetic operation for anti-vibration and an anti-vibration control request is received in Step S310 as the result, the camera controller 324 executes an anti-vibration control process in Step S311 and thereby controls anti-vibration operations of the camera body 310 and the lens adapter 330. On the other hand, when it is determined to cause the lens adapter 330 to perform an arithmetic operation for anti-vibration, no anti-vibration control request is received. In this case, the camera controller 324 executes an anti-vibration operation of the camera body 310 under control of the lens adapter 330 in Step S315. Note that, the anti-vibration control process of Step S311 or the anti-vibration operation of Step S315 may be performed after some time has elapsed from the reception of an anti-vibration control request (e.g., at the time of imaging, auto-focus driving, or the like).

(2) Process of Lens Adapter

Figure 22:
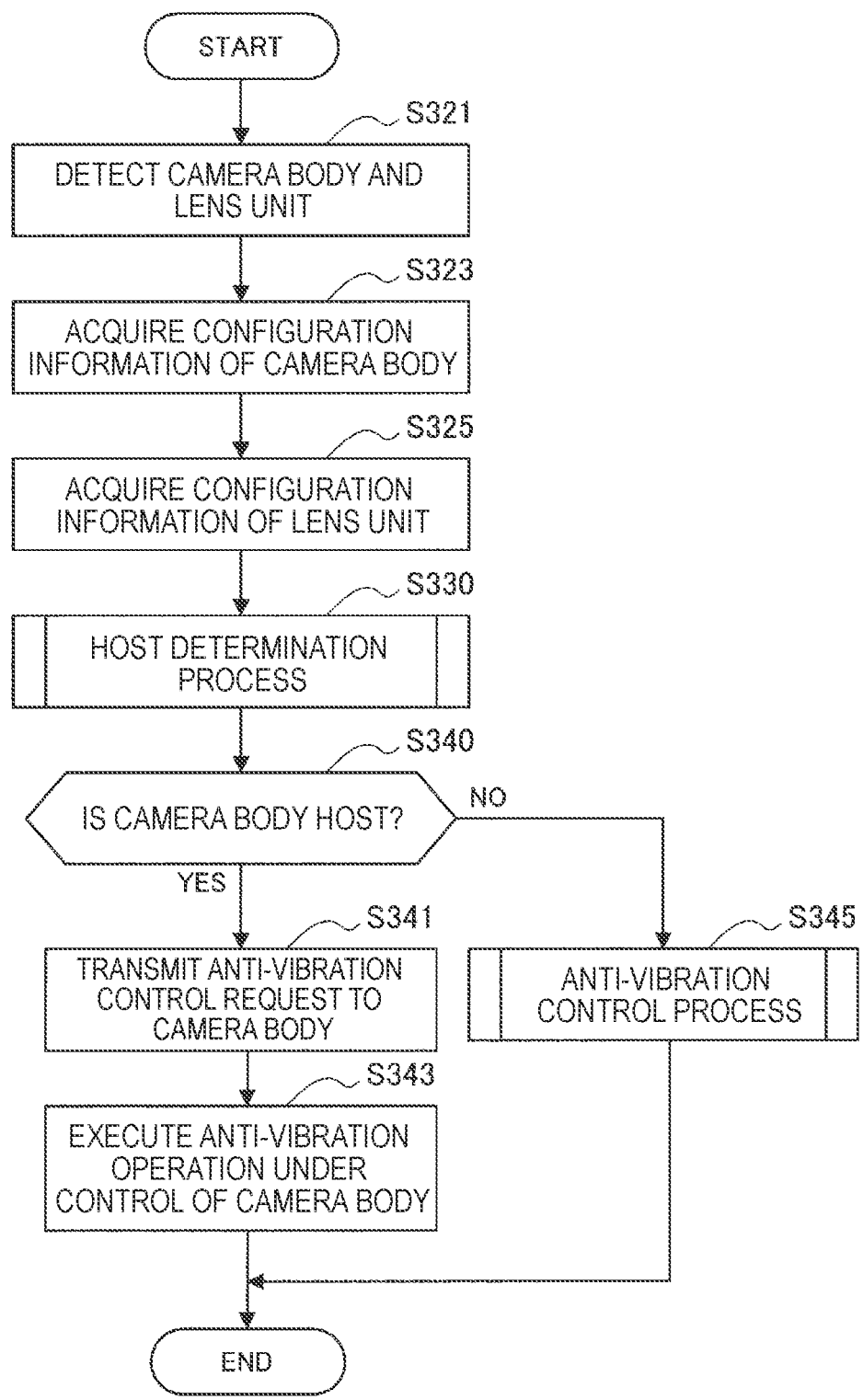
FIG. 22 is a flowchart illustrating an example of an overall flow of a process executed by a processing device of a lens adapter according to the third embodiment.

FIG. 22 is a flowchart illustrating an example of an overall flow of a process executed by the adapter controller 334 of the lens adapter 330 according to the third embodiment.

Referring to FIG. 22, first, the adapter controller 334 detects the camera body 310 via the body-side interface 339a and detects a lens unit via the lens-side interface 339b in Step S321.

Next, the adapter controller 334 acquires configuration information of the camera body 310 in Step S323. In addition, the adapter controller 334 acquires configuration information of the detected lens unit in Step S325. The adapter controller 334 may receive configuration information as, for example, a response to an inquiry signal or receive configuration information that can be periodically sent. In a case in which there is no response to the inquiry signal for a predetermined period of time, the adapter controller 334 may determine that the lens unit does not have the anti-vibration function. In addition, the adapter controller 334 may read corresponding configuration information from a configuration information list stored in the memory 338 in advance using identification information such as a model number of each unit. The configuration information of the camera body 310 indicates that the camera body 310 has the anti-vibration function. The configuration information of the lens unit 140a indicates that the lens unit 140a has the anti-vibration function, and the configuration information of the lens unit 140b indicates that the lens unit 140b does not have the anti-vibration function.

Next, the adapter controller 334 executes the host determination process described using FIG. 6, FIG. 7A, or FIG. 7B using the configuration information of the camera body and the lens unit and determines which unit is to be caused to perform an arithmetic operation for anti-vibration in Step S330.

Processes performed thereafter branch depending on the result of the host determination process (Step S340). For example, in a case in which it is determined that the camera body 310 is to be caused to perform an arithmetic operation for anti-vibration, the adapter controller 334 transmits an anti-vibration control request to the camera body 310 in Step S341. Then, the adapter controller 334 executes an anti-vibration operation of the lens adapter 330 under control of the camera body 310 in Step S343. On the other hand, in a case in which the adapter controller 334 determines to cause the lens adapter 330 to perform an arithmetic operation for anti-vibration (i.e., the adapter controller 334 itself performs an arithmetic operation), the adapter controller 334 executes an anti-vibration control process in Step S345 to control anti-vibration operations of the lens unit, the lens adapter 330, and the camera body 310. Note that, the anti-vibration operation of Step S343 or the anti-vibration control process of Step S345 may be performed after some time has elapsed from the determination of the host or the transmission of the anti-vibration control request (e.g., at the time of imaging, auto-focus driving, or the like).

(3) Anti-Vibration Control Process

A flow of the anti-vibration control process that can be executed in Step S345 of FIG. 22 in which the three units are involved in the case in which the lens adapter serves as the host may be similar to the flow illustrated in FIG. 8. In addition, a flow of the anti-vibration control process that can be executed in Step S311 of FIG. 21 in the case in which the camera body serves as the host may be similar to the flow illustrated in FIG. 9 or FIG. 10.

5. FOURTH EMBODIMENT

In the previous section, the example in which the camera body 310 has the mechanism for driving the image sensor for anti-vibration has been described. In the present section, an example in which a lens adapter executes the host determination process for anti-vibration and a camera body does not have a mechanism for driving an image sensor will be described as a fourth embodiment.

5-1. Detailed Configuration of Each Unit

Figure 23A:
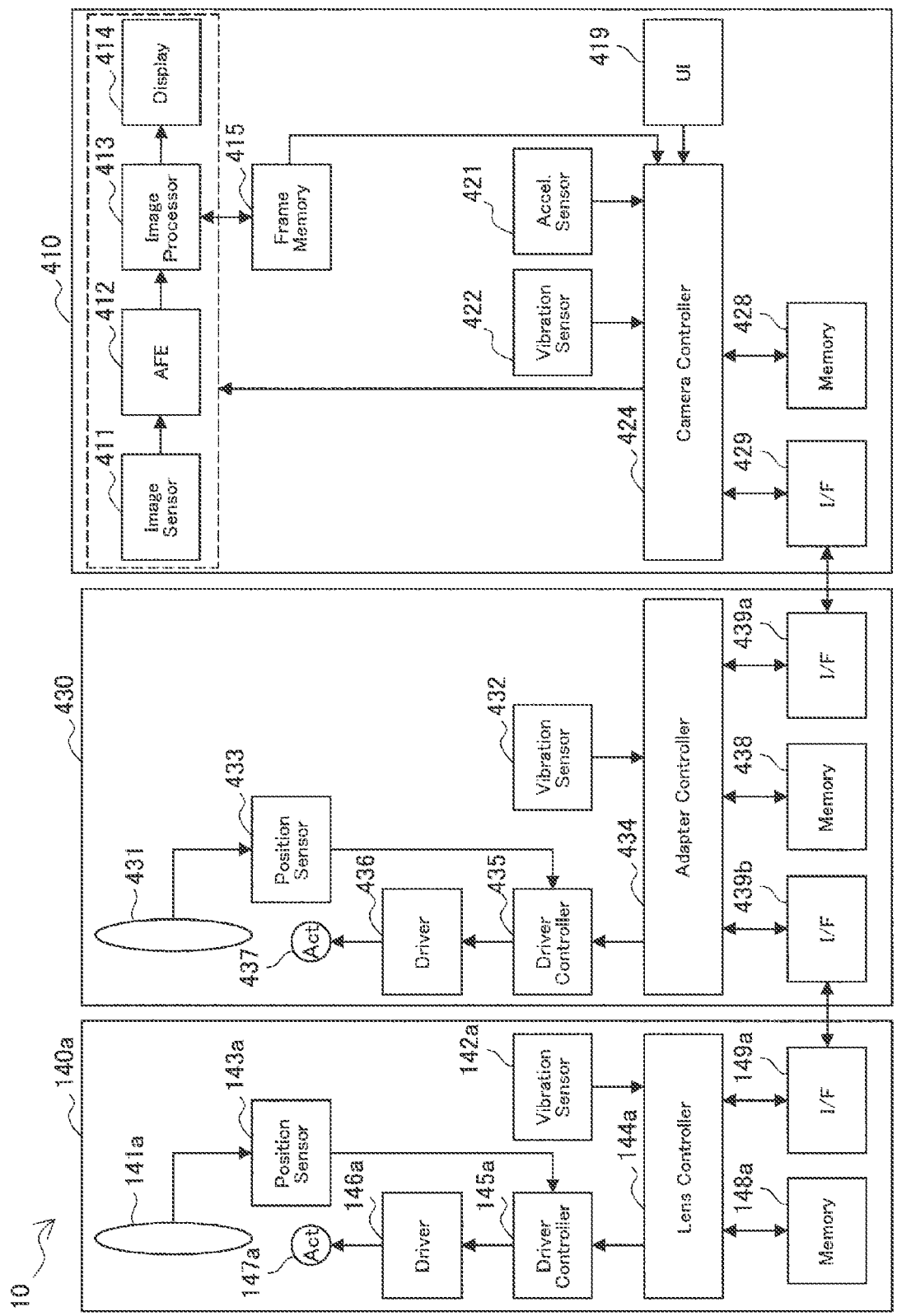
FIG. 23A is a block diagram illustrating an example of a detailed configuration of a camera system according to a fourth embodiment in which a lens unit with an anti-vibration function is mounted.
Figure 23B:
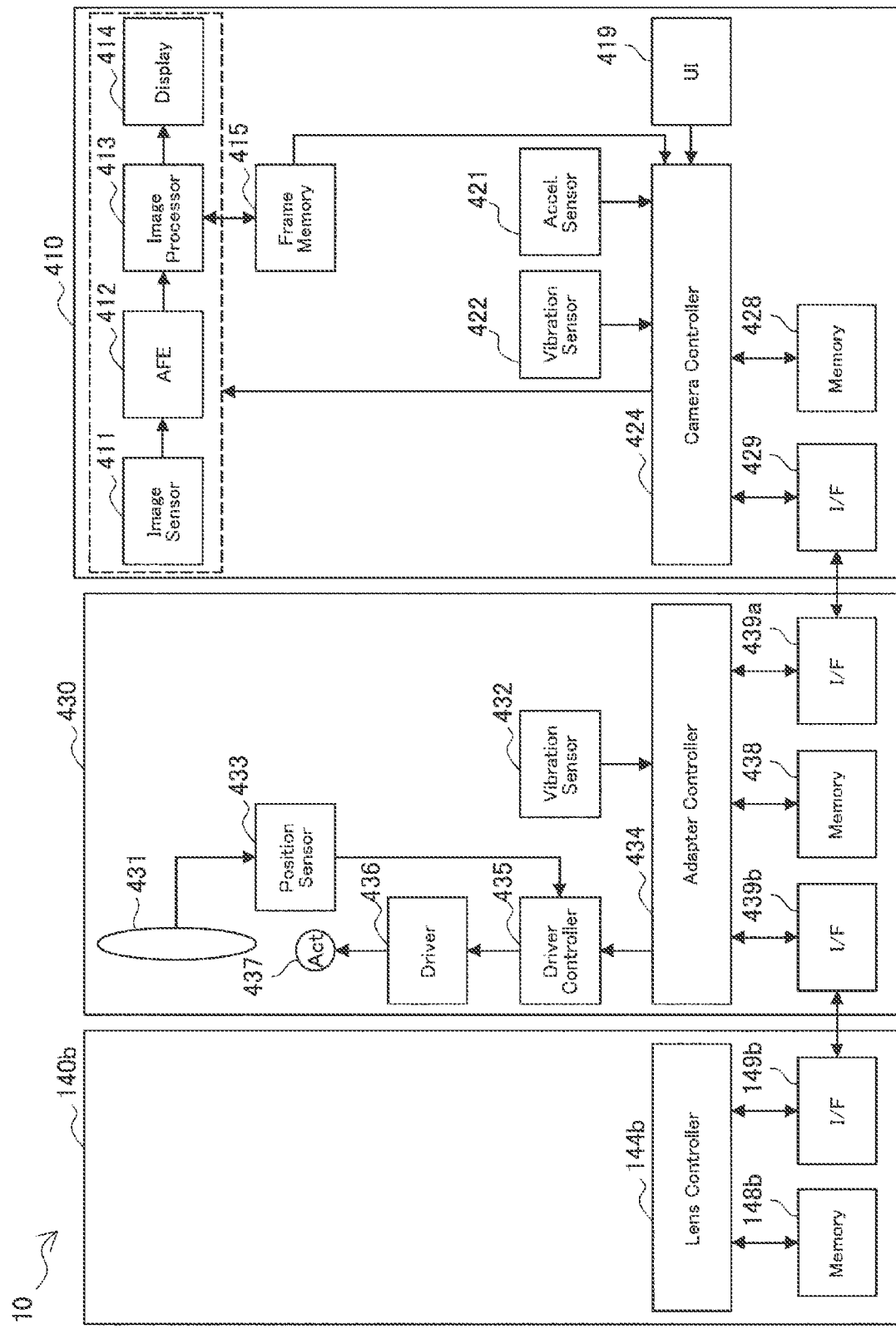
FIG. 23B is a block diagram illustrating an example of a detailed configuration of the camera system according to the fourth embodiment in which a lens unit with no anti-vibration function is mounted.

FIG. 23A is a block diagram illustrating an example of a detailed configuration of a camera system 10 according to a fourth embodiment in which a lens unit with an anti-vibration function is mounted. FIG. 23B is a block diagram illustrating an example of a detailed configuration of the camera system 10 according to the fourth embodiment in which a lens unit with no anti-vibration function is mounted.

Referring to FIG. 23A, the camera system 10 includes a camera body 410 and a lens adapter 430. The camera body 410 has a sensor for an anti-vibration function of suppressing blur in a captured image. The lens adapter 430 has the anti-vibration function. Furthermore, a lens unit 140a is mounted on the camera body 410 via the lens adapter 430. The lens unit 140a also has an anti-vibration function of suppressing blur in a captured image.

The camera body 410 has an image sensor 411, an AFE 412, an image processor 413, a display 414, a frame memory 415, a UI 419, an acceleration sensor 421, a vibration sensor 422, a camera controller 424, a memory 428, and an interface 429. The image sensor 411 converts a signal of light incident along an optical axis of the camera system 10 into an electrical signal. The AFE 412 performs processing of the analog domain on an analog image signal that is an electrical signal input from the image sensor 411 and converts the processed analog image signal into a digital image signal. The image processor 413 performs processing of the digital domain on a digital image signal input from the AFE, 412. The image processor 413 may superimpose an OSD for displaying information regarding a system setting or a user input on an image displayed by the display 414. The digital image signal processed by the image processor 413 is output to at least one of the display 414 or the frame memory 415. The display 414 displays an image on a screen on the basis of the digital image signal input from the image processor 413. The frame memory 415 stores the digital image signal input from the image processor 413 as image data. The UI 419 may include any type of input interface for receiving user inputs. The acceleration sensor 421 measures an acceleration applied to the camera body 410. The vibration sensor 422 measures an angular velocity of the camera body 410.

The camera controller 424 is a processing device that controls overall operations such as imaging by the camera body 410 and displaying and recording of images. In addition, in a case in which a lens unit or a lens adapter mounted or connected to the camera body 410 has the anti-vibration function, the camera controller 424 can also perform coordinative control on anti-vibration operations performed in the entire camera system 10. In the present embodiment, the camera controller 424 performs a coordinative arithmetic operation for anti-vibration in a case in which an adapter controller 434 of the lens adapter 430 determines that the camera body 410 is the host to anti-vibration operations. The memory 428 is a storage medium that stores programs and data for control of the camera controller 424. The interface 429 provides communication connection of the camera body 410 and the lens adapter or the lens unit.

The lens adapter 430 has an anti-vibration lens 431, a vibration sensor 432, a position sensor 433, an adapter controller 434, a driver controller 435, a driver 436, an actuator 437, a memory 438, a body-side interface 439a, and the lens-side interface 439b. The anti-vibration lens 431 changes a path of light passing through the optical system of the camera system 10 in accordance with its own position. The vibration sensor 432 measures angular velocities of the lens adapter 430. The position sensor 433 measures a position of the anti-vibration lens 431.

The adapter controller 434 is a processing device that controls anti-vibration operations of the lens adapter 430 and thereby suppresses blur in captured images. In a case in which the lens unit or the camera body connected to the lens adapter 430 has an anti-vibration function, the adapter controller 434 can also perform coordinative control of anti-vibration operations performed in the entire camera system 10. In the present embodiment, the adapter controller 434 determines the host to anti-vibration operations by executing the host determination process described using FIG. 6, FIG. 7A, or FIG. 7B. The driver controller 435 determines a drive amount of the anti-vibration lens 431 on the basis of control target values instructed by the adapter controller 434 and a current position input from the position sensor 433. The driver 436 outputs a drive signal indicating the drive amount determined by the driver controller 435 to the actuator 437. The actuator 437 shifts the position of the anti-vibration lens 431 in accordance with the drive signal input from the driver 436. The memory 438 is a storage medium that stores programs and data for control of the adapter controller 434. The body-side interface 439a provides communication connection between the lens adapter 430 and the camera body 410. The lens-side interface 439b provides communication connection between the lens adapter 430 and the lens unit.

Referring to FIG. 23B, the camera system 10 includes the camera body 410 and the lens adapter 430, similarly to the example of FIG. 23A. Furthermore, the lens unit 140b is mounted on the camera body 410 via the lens adapter 430. The lens unit 140b does not have the anti-vibration function.

5-2. Host Determination Condition

In the present embodiment, the adapter controller 434 that is the processing device of the lens adapter 430 determines a mounting state of the lens unit and determines the host to anti-vibration operations on the basis of the determination result, as described above. A specific host determination condition may be on the basis of whether or not a lens unit to be mounted on the camera body 410 via the lens adapter 430 has the anti-vibration function, as in the example shown in Table 1. Additionally or alternatively, host determination conditions may include a condition relating to communication performance, as in the examples shown in Table 2 to Table 4. For example, in a case in which the lens unit has the anti-vibration function, when it is determined that communication performance between the lens adapter 430 and the camera body 310 does not satisfy a predetermined condition, the host that should primarily perform an arithmetic operation for anti-vibration may be automatically determined on the basis of a user input or an imaging mode. The host determination process may be triggered by any event such as input of power to the camera body 410 and the lens adapter 430, detection of replacement of the lens unit, or the like.

5-3. Flow of Process

An overall flow of a process executed by the camera controller 424 of the camera body 410 may be similar to the flow described using FIG. 21. In addition, an overall process of a process executed by an adapter controller 434 of the lens adapter 430 may be similar to the flow described using FIG. 22.

A flow of the anti-vibration control process that can be executed in Step S345 of FIG. 22 in which the three units are involved in the case in which the lens adapter serves as the host may be similar to the flow illustrated in FIG. 18. In addition, a flow of the anti-vibration control process that can be executed in Step S311 of FIG. 21 in the case in which the camera body serves as the host may be similar to the flow illustrated in FIG. 19.

A coordinative arithmetic process for an anti-vibration operation executed in the present embodiment may be similar to those described using FIGS. 11 to 15. In the present embodiment, however, the camera body 410 has no actuator while having sensors for the anti-vibration function. For this reason, for example, control quantities such as a shift amount in the yaw direction and a shift amount in the pitch direction may not be distributed to the camera body 410. In addition, arithmetic operations for rotation in the roll direction may be omitted. In the scenario of FIG. 19, since the lens unit 140b is not involved in the anti-vibration operation and the camera body 410 does not drive the image sensor 411, the anti-vibration operation may be similar to a normal anti-vibration operation performed in a single unit except that vibration amount representative value can be derived from sensor data collected from the camera body 410 and the lens adapter 430.

6. CONCLUSION

So far, several embodiments of the technology according to the present disclosure have been described in detail using FIGS. 1, 2A, 2B, 3A, 3B, 4, 5, 6, 7A, 7B, 8, 9, 10, 11, 12, 13, 14, 15, 16, 17A, 17B, 18, 19, 20A, 20B, 21, 22, 23A, and 23B. According to the embodiments, in a case in which a lens unit is mounted on a camera body via a lens adapter having an anti-vibration function of suppressing blur in a captured image, whether the mounted lens unit has the anti-vibration function is determined, and whether one of the lens adapter and the camera body is to be caused to perform a coordinative arithmetic operation for anti-vibration is determined on the basis of the result of the determination. Thus, competition in anti-vibration operations that can be caused in a case in which each of the lens adapter and the camera body (or the lens unit, the lens adapter, and the camera body) individually performs an anti-vibration operation can be prevented, anti-vibration performance can be exhibited more effectively than in, for example, an existing technique in which a specific unit uniformly executes coordinative arithmetic operations.

In the case in which the lens unit also has the anti-vibration function, for example, the role of host that executes coordinative arithmetic operations for anti-vibration can be assigned to the lens adapter intervening between the camera body and the lens unit, and thereby a communication path for sensor data and control data that are exchanged between the units for anti-vibration control can be shortened and a control delay can be minimized. In addition, an increase in a transmission data amount for anti-vibration control can also be reduced.

In the case in which the lens unit does not have the anti-vibration function, the length of the communication path necessary for anti-vibration control does not change normally even if one of the camera body and the lens adapter serves as the host to anti-vibration operations. In this case, by causing the camera body to perform an arithmetic operation for anti-vibration, the anti-vibration function (e.g., suppression of blur in an image caused by rotation in the roll direction) unique to the camera body can be primarily utilized. In addition, since the capability of the processing device of the camera body is generally higher than those of other units in most cases, in the case in which the length of the communication path does not change, utilizing the high processing capability of the processing device of the camera body is advantageous for improving responsiveness of control.

In the case in which the lens unit has the anti-vibration function and communication performance between the lens adapter and the camera body does not satisfy an expected level, even if the role of host to anti-vibration operations is assigned to the lens adapter, it can be difficult for both the lens adapter and the camera body to secure sufficient control periods. In this case, by determining the host to anti-vibration operations on the basis of a user input or an imaging mode, anti-vibration suitable for the needs of users or capturing scenes can be provided. However, in the case in which the lens unit has the anti-vibration function and communication performance between the lens adapter and the camera body does not satisfy the expected level, the role of host to anti-vibration operations may be assigned to the lens adapter for the purpose of shortening the communication path for sensor data and control data to be exchanged between the units for anti-vibration control.

In addition, the coordinative arithmetic operation executed by the host to anti-vibration operations can include calculation of one or more control quantities for each of a plurality of anti-vibration functions based on vibration amounts detected by one or more of the lens unit, the lens adapter, and the camera body. This means that, for example, in a case in which a unit determined as the host calculates control quantities, vibration amounts detected by the lens unit, the lens adapter, and the camera body can be included in the arithmetic operation and control quantities for the lens unit, the lens adapter, and the camera body can be calculated. According to the above-described embodiments, since the communication path for sensor data in which the vibration amounts are described and control data in which control quantities are described is optimized, optimum anti-vibration performance for the system can be exhibited.

In addition, the coordinative arithmetic operation can include distribution of a total control quantity calculated on the basis of vibration amounts detected by one or more of the lens unit, the lens adapter, and the camera body to control quantities for the plurality of anti-vibration functions. In a case in which only the anti-vibration function of a single unit is utilized, for example, it is not possible to eliminate influence of vibration exceeding the control limit of the single anti-vibration function. However, since the total control quantity is distributed to the lens unit, the lens adapter, and the camera body (or the lens adapter and the camera body) according to the above-described embodiments, for example, anti-vibration operations with the total control quantity exceeding the control limit of the single anti-vibration function can be provided in the whole system.

Note that, the processes of each of the units described in the present specification may be realized using any of software, hardware, and a combination of software and hardware. A program included in software is stored in, for example, a storage medium (a non-transitory medium) provided inside or outside of each unit. In addition, each program is read in, for example, a random access memory (RAM) at the time of execution and executed by a processor such as a central processing unit (CPU).

In addition, the processes described using the flowcharts in the present specification may not necessarily be executed in the order shown in the flowcharts. Several processing steps may be executed in parallel. In addition, additional processing steps may be adopted, and some of processing steps may be omitted.

In addition, the communication path described in the present specification may be formed in wireless connection, rather than wired connection, as a whole or partially. The wireless connection may be established using any type of wireless communication protocol such as a wireless local area network (LAN, which is also called Wi-Fi), Bluetooth (registered trademark), or near field communication (NFC).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A processing device including:

a determination unit configured to determine, in a case in which a lens unit is mounted on a camera body via a lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

(2)

The processing device according to (1), in which the determination unit determines to cause the camera body to perform an arithmetic operation for anti-vibration on the basis of determination that the lens unit does not have the anti-vibration function.

(3)

The processing device according to (1) or (2), in which the determination unit determines to cause the lens adapter to perform the coordinative arithmetic operation for anti-vibration when it is determined that communication performance between the lens adapter and the camera body satisfies a predetermined condition in the case in which the lens unit has the anti-vibration function.

(4)

The processing device according to (3), in which the determination unit determines which one of the lens adapter and the camera body is to be caused to perform an arithmetic operation for anti-vibration on the basis of a user input when it is determined that the communication performance does not satisfy the predetermined condition in the case in which the lens unit has the anti-vibration function.

(5)

The processing device according to (3), in which the determination unit determines to cause one of the lens adapter and the camera body that is recommended on the basis of an imaging mode to perform an arithmetic operation for anti-vibration when it is determined that the communication performance does not satisfy the predetermined condition in the case in which the lens unit has the anti-vibration function.

(6)

The processing device according to any one of (3) to (5), in which the determination unit determines whether the communication performance satisfies the predetermined condition on the basis of a communication speed or a communication protocol supported by the lens adapter or the camera body.

(7)

The processing device according to any one of (1) to (6), in which the determination unit determines a unit to be caused to perform an arithmetic operation for anti-vibration on the basis of the determination of whether the lens unit has the anti-vibration function after power is input to the camera body.

(8)

The processing device according to any one of (1) to (7), in which the determination unit determines a unit to be caused to perform an arithmetic operation for anti-vibration on the basis of determination of whether a new lens unit has the anti-vibration function after replacement of the lens unit is detected.

(9)

The processing device according to any one of (1) to (8), in which the coordinative arithmetic operation includes calculation of one or more control quantities for each of a plurality of anti-vibration functions based on a vibration amount detected by one or more of the lens unit, the lens adapter, and the camera body.

(10)

The processing device according to (9), in which the coordinative arithmetic operation includes distribution of a total control quantity calculated on the basis of the vibration amount detected by one or more of the lens unit, the lens adapter, and the camera body to the control quantities for the plurality of anti-vibration functions.

(11)

The processing device according to (9) or (10), in which the control quantities for the anti-vibration function of the lens unit and the anti-vibration function of the lens adapter include a shift amount of an anti-vibration lens in a direction orthogonal to an optical axis, and the control quantity for the anti-vibration function of the camera body includes a shift amount of an image sensor in a direction orthogonal to the optical axis.

(12)

The processing device according to (11), in which the control quantity for the anti-vibration function of the camera body further includes a rotation amount of the image sensor around the optical axis.

(13)

A lens adapter including:

a housing configured to be connectable to a lens unit and a camera body; and a processing device configured to determine, in a case in which the lens unit is mounted on the camera body via the lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

(14)

A camera body including:

a housing configured to be connectable to a lens adapter; and a processing device configured to determine, in a case in which a lens unit is mounted on the camera body via the lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

(15)

An anti-vibration control method including:

determining, by a processing device, whether a lens unit has an anti-vibration function of suppressing blur in a captured image in a case in which the lens unit is mounted on a camera body via a lens adapter having the anti-vibration function; and determining to cause the lens adapter to perform a coordinative arithmetic operation for anti-vibration on the basis of determination that the lens unit has the anti-vibration function.

(16)

A program causing a processor to function as:

a determination unit configured to determine, in a case in which a lens unit is mounted on a camera body via a lens adapter having an anti-vibration function of suppressing blur in a captured image, whether the lens unit has the anti-vibration function and determine to cause the lens adapter to perform a coordinative arithmetic operation for anti-vibration on the basis of determination that the lens unit has the anti-vibration function.

(17)

A lens unit having an anti-vibration function of suppressing blur in a captured image, the lens unit including:

a control unit that causes the anti-vibration function of the lens unit to drive under control of the lens unit or a camera body that is dynamically determined to perform a coordinative arithmetic operation for anti-vibration in a case in which the lens unit is mounted on the camera body via a lens adapter having the anti-vibration function.

REFERENCE SIGNS LIST 10 camera system
15 optical axis
20, 110, 210, 310, 410 camera body
21 housing
22, 111, 211, 311, 411 image sensor
26, 124, 224, 324, 424 processing device (camera controller/determination unit)
30, 130, 230, 330, 430 lens adapter
31 housing
36, 134, 234, 334, 434 processing device (adapter controller/determination unit)
40a, 40b, 140a, 140b lens unit
41a, 41b housing
46a, 46b, 144a, 144b processing device (lens controller)

The invention claimed is:

1. A processing device, comprising:
a determination unit configured to:
determine, in a case in which a lens unit is mounted on a camera body via a lens adapter having an anti-vibration function, the lens unit has the anti-vibration function,
wherein the anti-vibration function is for suppression of a blur in a captured image;
determine, based on the determination the lens unit has the anti-vibration function, a communication performance between the lens adapter and the camera body satisfies a specific condition; and
control the lens adapter to perform a coordinative arithmetic operation for anti-vibration, wherein
the coordinative arithmetic operation includes calculation of at least one control quantity for the anti-vibration function of each of the lens unit and the lens adapter,
the calculation is based on a vibration amount detected by each of the lens unit and the lens adapter,
the control of the lens adapter is based on the determination the lens unit has the anti-vibration function and the determination the communication performance between the lens adapter and the camera body satisfies the specific condition, and
the lens adapter controls an anti-vibration operation of the lens unit based on the coordinative arithmetic operation performed by the lens adapter.

2. The processing device according to claim 1, wherein the determination unit is further configured to control the camera body to perform the coordinative arithmetic operation for the anti-vibration, in a case in which the lens unit does not have the anti-vibration function.

3. The processing device according to claim 1, wherein the determination unit is further configured to determine, in a case in which the communication performance does not satisfy the specific condition, which one of the lens adapter and the camera body is to be controlled to perform the coordinative arithmetic operation for the anti-vibration, and
the determination which one of the lens adapter and the camera body is to be controlled to perform the coordinative arithmetic operation is based on a user input and the determination the lens unit has the anti-vibration function.

4. The processing device according to claim 1, wherein the determination unit is further configured to control, based on an imaging mode and the determination the lens unit has the anti-vibration function, one of the lens adapter or the camera body to perform the coordinative arithmetic operation for the anti-vibration in a case in which the communication performance does not satisfy the specific condition.

5. The processing device according to claim 1, wherein the determination unit is further configured to determine the communication performance satisfy the specific condition based on one of a communication speed supported by the lens adapter and the camera body or a communication protocol supported by the lens adapter and the camera body.

6. The processing device according to claim 1, wherein the determination unit is further configured to determine, subsequent to input of power to the camera body, a unit to perform the coordinative arithmetic operation for the anti-vibration based on the determination the lens unit has the anti-vibration function.

7. The processing device according to claim 1, wherein the determination unit is further configured to:
detect replacement of the lens unit;
determine, subsequent to the replacement of the lens unit, a new lens unit has the anti-vibration function; and
determine, based on the determination the new lens unit has the anti-vibration function, a unit to perform the coordinative arithmetic operation for the anti-vibration.

8. The processing device according to claim 1, wherein the calculation of the at least one control quantity is further based on the vibration amount detected by each of the lens unit, the lens adapter, and the camera body.

9. The processing device according to claim 8, wherein the coordinative arithmetic operation further includes distribution of a total control quantity calculated based on the vibration amount detected by each of the lens unit, the lens adapter, and the camera body to control quantities for the anti-vibration function of the lens unit and the anti-vibration function of the lens adapter.

10. The processing device according to claim 8, wherein the at least one control quantity for the anti-vibration function of each of the lens unit and the lens adapter includes a shift amount of an anti-vibration lens in a direction orthogonal to an optical axis,
the optical axis corresponds to each of the lens unit, the lens adapter, and the camera body, and
a control quantity for the anti-vibration function of the camera body includes a shift amount of an image sensor in the direction orthogonal to the optical axis.

11. The processing device according to claim 10, wherein the control quantity for the anti-vibration function of the camera body further includes a rotation amount of the image sensor around the optical axis.

12. The processing device according to claim 1, wherein the determination unit is further configured to:
receive configuration information from the lens unit via the lens adapter; and
determine the lens unit has the anti-vibration function based on the configuration information.

13. A lens adapter, comprising:
a housing configured to be connectable to a lens unit and a camera body,
wherein the lens adapter has an anti-vibration function for suppression of a blur in a captured image; and
a processing device configured to:
determine, in a case in which the lens unit is mounted on the camera body via the lens adapter, the lens unit has the anti-vibration function;
determine, based on the determination the lens unit has the anti-vibration function, a communication performance between the lens adapter and the camera body satisfies a specific condition;
acquire a vibration amount of each of the lens unit and the lens adapter;
control the lens adapter to perform a coordinative arithmetic operation for anti-vibration, wherein
the coordinative arithmetic operation includes calculation of at least one control quantity for the anti-vibration function of each of the lens unit and the lens adapter,
the calculation is based on the vibration amount of each of the lens unit and the lens adapter,
the control of the lens adapter is based on the determination the lens unit has the anti-vibration function and the determination the communication performance between the lens adapter and the camera body satisfies the specific condition; and
control an anti-vibration operation of the lens unit based on the coordinative arithmetic operation.

14. A camera body, comprising:
a housing configured to be connectable to a lens adapter,
wherein the lens adapter has an anti-vibration function for suppression of a blur in a captured image; and
a processing device configured to:
determine, in a case in which a lens unit is mounted on the camera body via the lens adapter, the lens unit has the anti-vibration function;
determine, based on the determination the lens unit has the anti-vibration function, a communication performance between the lens adapter and the camera body satisfies a specific condition; and
control the lens adapter to perform a coordinative arithmetic operation for anti-vibration, wherein
the coordinative arithmetic operation includes calculation of at least one control quantity for the anti-vibration function of each of the lens unit and the lens adapter,
the calculation is based on a vibration amount detected by each of the lens unit and the lens adapter,
the control of the lens adapter is based on the determination the lens unit has the anti-vibration function and the determination the communication performance between the lens adapter and the camera body satisfies the specific condition, and
the lens adapter controls an anti-vibration operation of the lens unit based on the coordinative arithmetic operation performed by the lens adapter.

15. An anti-vibration control method, comprising:
determining, by a processing device, a lens unit has an anti-vibration function of suppressing a blur in a captured image in a case in which the lens unit is mounted on a camera body via a lens adapter having the anti-vibration function;

determining, by the processing device, a communication performance between the lens adapter and the camera body satisfies a specific condition based on the determination the lens unit has the anti-vibration function; and controlling, by the processing device, the lens adapter to perform a coordinative arithmetic operation for anti-vibration, wherein the coordinative arithmetic operation includes calculation of at least one control quantity for the anti-vibration function of each of the lens unit and the lens adapter, the calculation is based on a vibration amount detected by each of the lens unit and the lens adapter, the control of the lens adapter is based on the determination the lens unit has the anti-vibration function and the determination the communication performance between the lens adapter and the camera body satisfies the specific condition, and the lens adapter controls an anti-vibration operation of the lens unit based on the coordinative arithmetic operation performed by the lens adapter.

16. A processing device, comprising:
a determination unit configured to:
  determine, in a case in which a lens unit is mounted on a camera body via a lens adapter having an anti-vibration function, the lens unit has the anti-vibration function,
    wherein the anti-vibration function is for suppression of a blur in a captured image;
  determine, based on the determination the lens unit has the anti-vibration function, a communication performance between the lens adapter and the camera body satisfies a specific condition;
  control the lens adapter to perform a coordinative arithmetic operation for anti-vibration, wherein the control of the lens adapter is based on the determination the lens unit has the anti-vibration function and the determination the communication performance between the lens adapter and the camera body satisfies the specific condition; and
  control, based on an imaging mode and the determination the lens unit has the anti-vibration function, one of the lens adapter or the camera body to perform the coordinative arithmetic operation for the anti-vibration in a case in which the communication performance does not satisfy the specific condition.

* * * * *